Dec. 8, 1964   C. J. BARTOSESKI ETAL   3,160,101
AUTOMATIC SELECTIVE CONTROL OF PUMPING ENGINES
Filed Feb. 15, 1962                              21 Sheets-Sheet 1

INVENTORS
CARL J. BARTOSESKI
ROBERT E. PICKETT
BY

INVENTORS
CARL J. BARTOSESKI
ROBERT E. PICKETT

Dec. 8, 1964     C. J. BARTOSESKI ETAL     3,160,101
AUTOMATIC SELECTIVE CONTROL OF PUMPING ENGINES
Filed Feb. 15, 1962                                            21 Sheets-Sheet 6

FIG. 6

INVENTORS
CARL J. BARTOSESKI
ROBERT E. PICKETT
BY

Dec. 8, 1964    C. J. BARTOSESKI ETAL    3,160,101
AUTOMATIC SELECTIVE CONTROL OF PUMPING ENGINES
Filed Feb. 15, 1962    21 Sheets-Sheet 10

AREA SIGNAL COUPLING CIRCUITS

*INVENTORS*
CARL J. BARTOSESKI
ROBERT E. PICKETT
BY

SUB — AREA SIGNAL COUPLING CIRCUITS

Dec. 8, 1964   C. J. BARTOSESKI ET AL   3,160,101
AUTOMATIC SELECTIVE CONTROL OF PUMPING ENGINES
Filed Feb. 15, 1962   21 Sheets-Sheet 14

INVENTORS
CARL J. BARTOSESKI
ROBERT E. PICKETT
BY

Dec. 8, 1964   C. J. BARTOSESKI ETAL   3,160,101
AUTOMATIC SELECTIVE CONTROL OF PUMPING ENGINES
Filed Feb. 15, 1962   21 Sheets-Sheet 15

INVENTORS
CARL J. BARTOSESKI
ROBERT E. PICKETT
BY

Dec. 8, 1964     C. J. BARTOSESKI ETAL     3,160,101
AUTOMATIC SELECTIVE CONTROL OF PUMPING ENGINES
Filed Feb. 15, 1962     21 Sheets-Sheet 16

INVENTORS
CARL J. BARTOSESKI
ROBERT E. PICKETT
BY

Dec. 8, 1964   C. J. BARTOSESKI ETAL   3,160,101
AUTOMATIC SELECTIVE CONTROL OF PUMPING ENGINES
Filed Feb. 15, 1962   21 Sheets-Sheet 17

INVENTORS
CARL J. BARTOSESKI
ROBERT E. PICKETT
BY

Dec. 8, 1964   C. J. BARTOSESKI ETAL   3,160,101
AUTOMATIC SELECTIVE CONTROL OF PUMPING ENGINES
Filed Feb. 15, 1962   21 Sheets-Sheet 18

INVENTORS
CARL J. BARTOSESKI
ROBERT E. PICKETT
BY

Dec. 8, 1964  C. J. BARTOSESKI ET AL  3,160,101
AUTOMATIC SELECTIVE CONTROL OF PUMPING ENGINES
Filed Feb. 15, 1962  21 Sheets-Sheet 19

INVENTORS
CARL J. BARTOSESKI
ROBERT E. PICKETT
BY

Dec. 8, 1964    C. J. BARTOSESKI ETAL    3,160,101
AUTOMATIC SELECTIVE CONTROL OF PUMPING ENGINES
Filed Feb. 15, 1962    21 Sheets-Sheet 21

INVENTORS
CARL J. BARTOSESKI
ROBERT E. PICKETT
BY 3,160,101
AUTOMATIC SELECTIVE CONTROL OF
PUMPING ENGINES
Carl J. Bartoseski and Robert E. Pickett, Galion, Ohio,
assignors to North Electric Company, Galion, Ohio, a
corporation of Ohio
Filed Feb. 15, 1962, Ser. No. 174,363
3 Claims. (Cl. 103—11)

The present invention relates to an automatic control system, and particularly to an automatic system for use in the control of the operation of pumping engines at gas compressor stations in a gas distribution system.

In the provision of fuel gas for industrial, institutional and home use, gas is conducted from the gas fields over the pipelines to the ultimate areas of use and storage. The conditions are not always such as to permit distribution by free flow, and as a result, a number of compressor stations, which include compressor engines, are installed at strategic points along the pipelines to provide the necessary volume of gas flow.

Until recently, manual controls operated by personnel at each of the compressor stations were used to vary the operating conditions of the engines at the station in an effort to obtain an efficient flow and volume of gas at the desired pressures throughout the system. However, various factors in the field have resulted in a trend toward automatic control of the compressor stations. In such arrangement, the desired gas discharge pressure (the set point) is furnished to automatic equipment at each station, and the control equipment at such station automatically controls the engines to provide the desired discharge pressure (set point). Such set point may be manually established in the automatic equipment, or in certain systems in which a central control station is used to control the equipment at each of the compressor stations which are located at remote points in the system, remote control equipment is provided to effect the transmission of signals between the stations which indicate pertinent data, such as the status of the suction and discharge pressures, the engine conditions, the performance of the different engines, and other similar information, including set point entered in the automatic equipment by remote control.

In any of these systems the required volume of gas flow at various combinations of suction and discharge pressures may be achieved by varying the number of engines which are in use, the speed of the engines in use, the number of pockets of the compressor cylinders which are open or closed, or the number of intake valves which are held open or closed. In compressor stations in which control is effected by variation of the compressor pockets in use, the control equipment is frequently operative to (1) control certain pockets to provide capacity of gas pumping; and (2) control other pockets to guard against exceeding the torque limitations of the engine under various combinations of suction and discharge pressures, i.e. to guard against overloading the engines.

Furthermore in such systems under some combinations of suction and discharge pressures (as possibly influenced by other variable factors), there may be no single engine combination capable of maintaining the set point, and the control equipment at the compressor station is forced to cycle in its use of various engine combinations in its effort to maintain the required discharge pressure (set point). Such condition is designated as a "gap" condition, and in the interest of efficient operation, such condition must be immediately recognized by the automatic equipment. In addition, it is essential that indications be provided locally and to the remote control operator, so that the set point can be adjusted either upward or downward to remove the gap condition and provide stable operation.

Under certain other operating conditions, combinations of suction and discharge pressures and other factors may result in the engines operating in an "overlap" condition of lesser efficiency. That is, in an "overlap" condition one too many engines is running to sustain the set point, whereas the use of one less engine with the remaining engines running at a faster speed and greater load than previously required, would maintain the set point. It is further essential, therefore, in the interest of efficient operation that the control equipment be operable to recognize such condition and to automatically effect the shutting down of one engine, and the acceleration and additional loading of the remaining engines in use.

It is an object of the present invention therefore to provide a novel control system which is automatically operative to control gas compressor engines in a system to operate in an efficient manner, and particularly to operate without overload to thereby minimize the possibility of damage to the equipment.

It is another object of the present invention to provide control equipment which is operative to automatically recognize potential gap, normal operating condition, and potential overlap tendencies as evidenced by combinations of suction and discharge pressures, and effect immediate selective control operations whenever an undesirable condition is detected.

It is a further object of the invention to provide novel control means which include transducer means for continually providing analog to digital signals representative of the existing suction and discharge pressures, an analog to digital connection for converting such signals to digital values, and novel switching means operative to effect the enablement of a predetermined number of engines which is considered acceptable for the indicated pressure conditions.

It is a further object of the present invention to provide novel crossbar switching equipment which is operable in response to the receipt of signals representative of the suction and discharge pressure in a system to automatically effect a predetermined control of the compressor engines for such conditions, the crossbar switches having the ability to provide non-linear programming to permit varying degrees of control (finer and coarser) for different conditions of operation.

It is a further object of the invention to provide novel switch means for effecting different control operations of a plurality of engines in accordance with the value of multiple digit signals received which relate to a first and a second set of data (suction and discharge pressures), different controls being provided in response to the receipt of at least certain different values of said first and second data, input means over which signals representative of the first and second data are received, a first crossbar switch including a plurality of crosspoint positions, each of which positions is connected to represent a predetermined value of said first data (suction pressure) and a predetermined value of said second data (discharge pressure), different positions representing different values, and means for selecting the crosspoints which represent the suction pressure and the discharge points indicated by the received signals, and control means operative with the selection of such crosspoints to provide an operating condition of the engines predetermined for such set of values.

It is yet another object of the invention to provide a control arrangement for establishing an operating condition of each of a plurality of engines which are predetermined in accordance with the value of the suction and discharge pressures in the system, input means over which digital signals representative of the suction and discharge pressures in the system are received, a first crossbar switch means including a plurality of crosspoint positions, each of which positions is connected to represent a given suction pressure and a given discharge pressure, and horizontal and vertical selection means on the switch for selecting the switching position which represents the combination of suction and discharge pressures represented by the digital signals, and a second crossbar switch including a plurality of area switching positions, each of which represents a range of suction pressures and a range of discharge pressures including selection means controlled by said first switching means to select the area switching position which includes the suction and discharge pressures represented by the received digital signals, selection means for selecting a sub-area of each larger area, and means connected to effect the operating condition required for the suction and discharge pressures represented by the input signals responsive to selection of the area and sub-area which include such values.

These and other advantages of the present invention will become apparent with reference to the following specification and accompanying drawings wherein basic embodiments of the structure are illustrated, and in which:

FIGURES 1 and 2 when arranged from left to right provide a block diagram of the novel switching means of the invention as connected in a distribution system;

Figure 10:
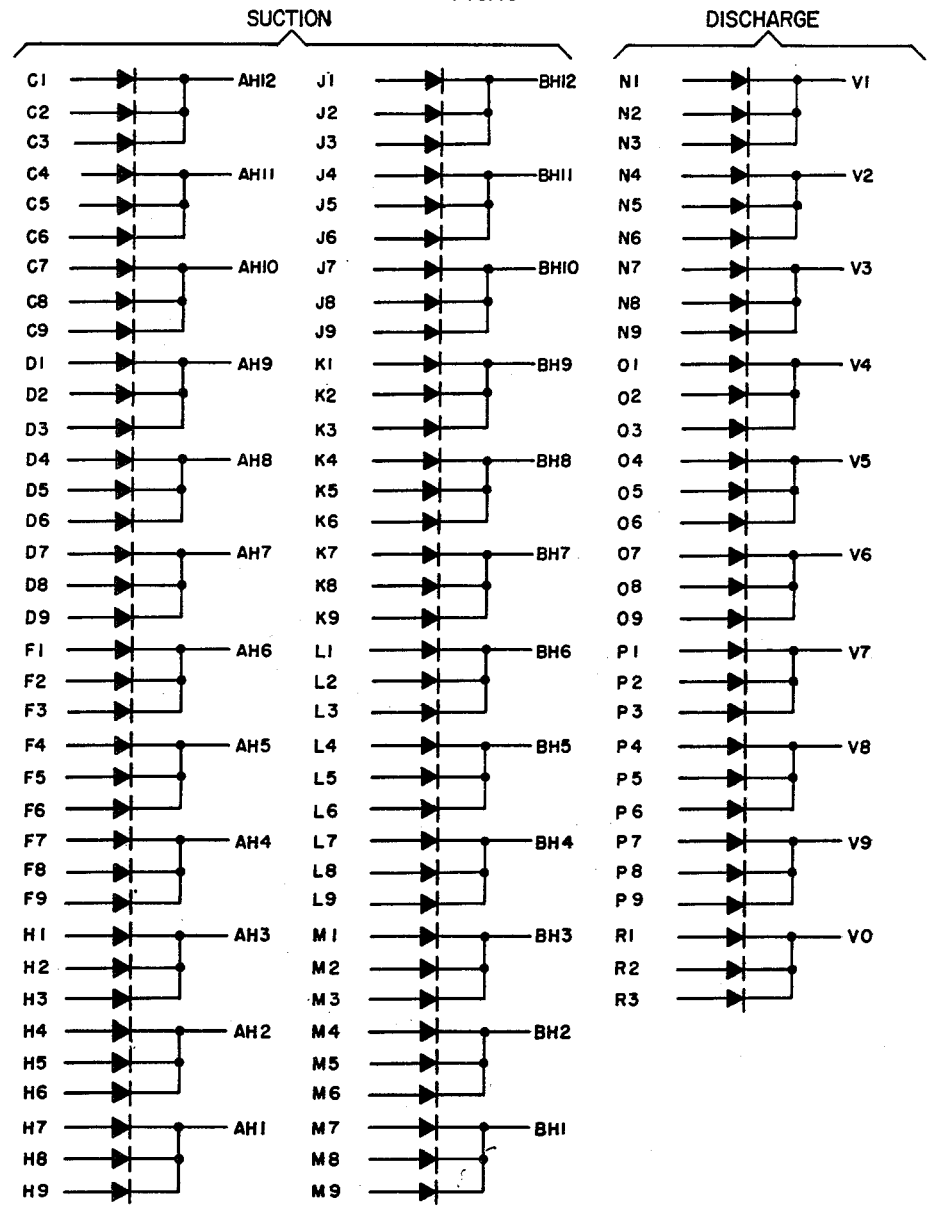
Figure 11:
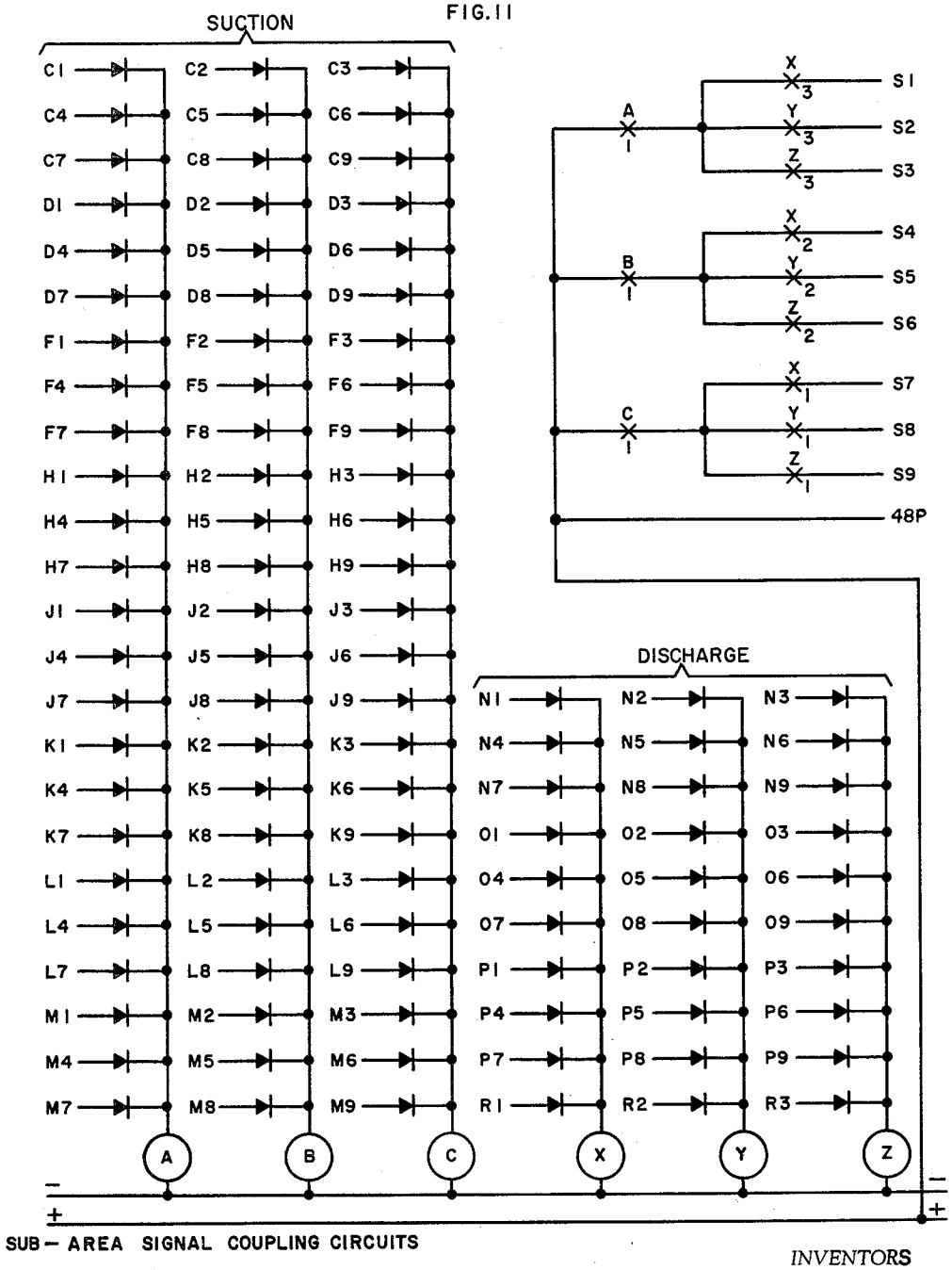
Figure 19:
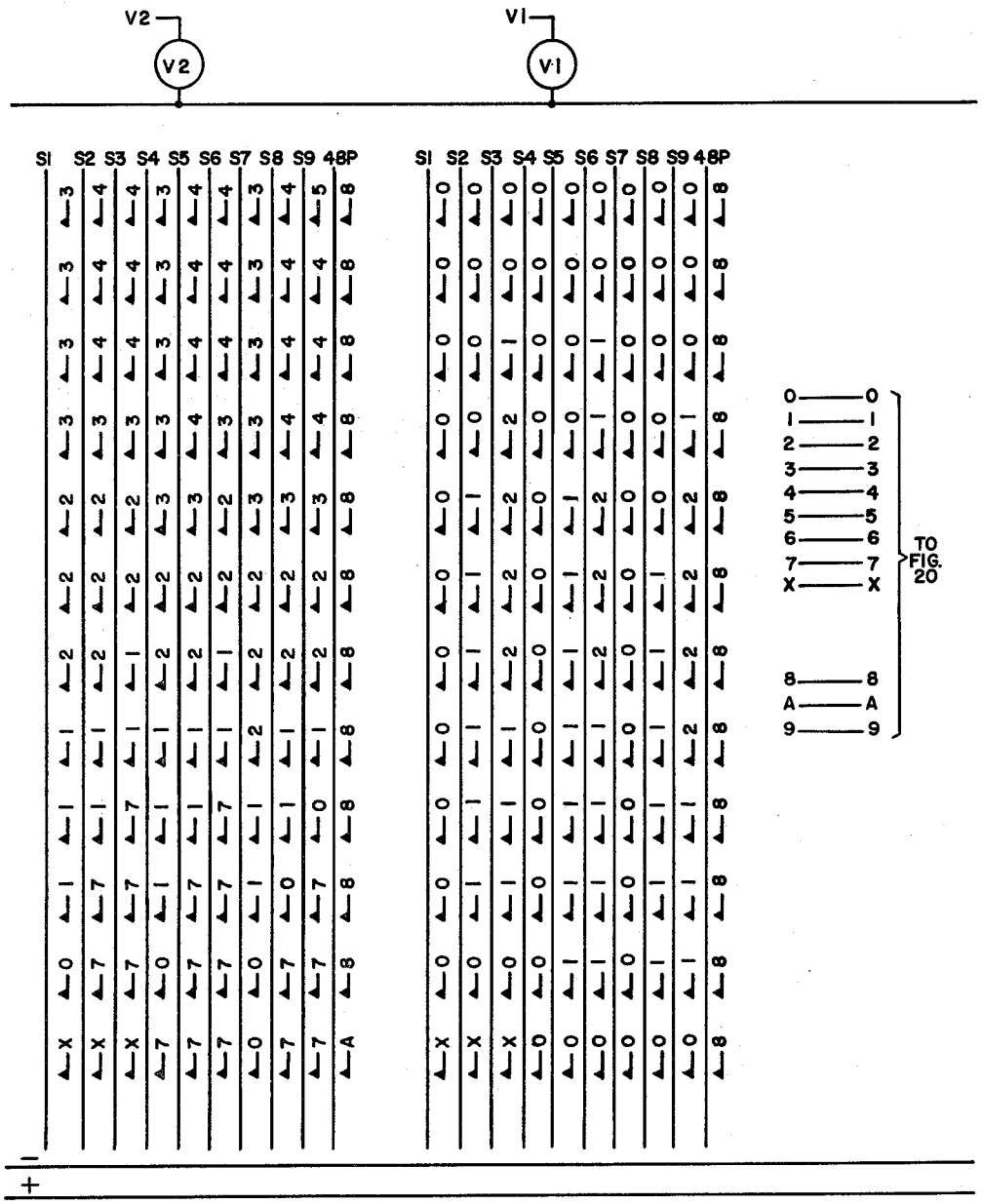
Figure 20:
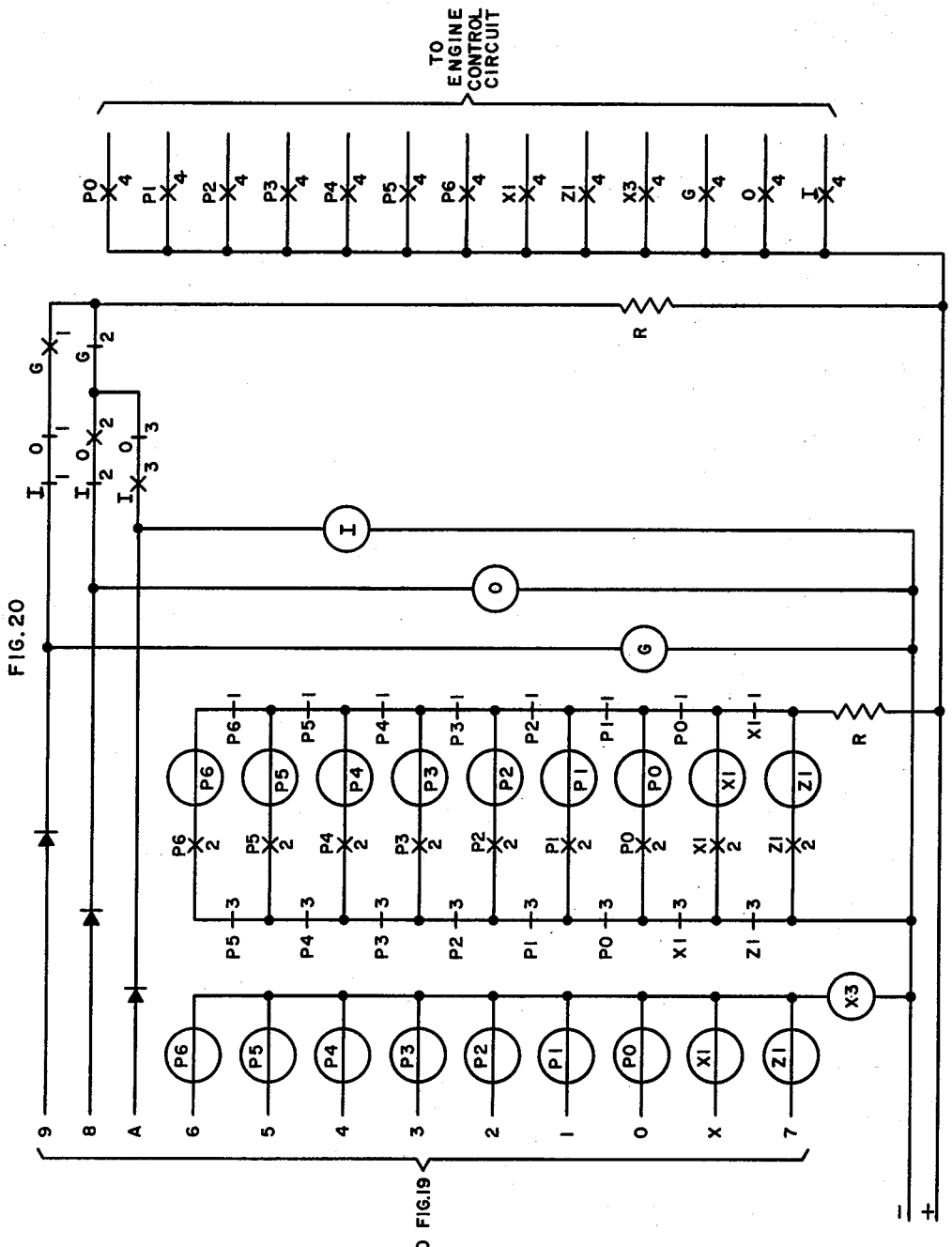
Figure 21:
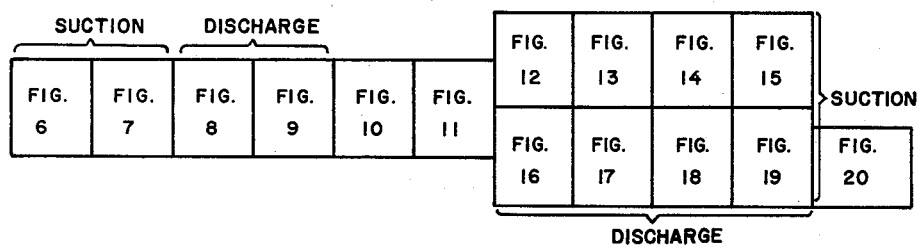

FIGURES 6–9 when arranged in the positions indicated in FIGURE 21, illustrate the first switching unit crossbar switch #1 in the novel switching equipment;

FIGURES 10 and 11 when placed in the positions indicated in FIGURE 21 illustrate the connections between the output circuits of the first switching unit and input circuits to the second switching unit of the equipment;

FIGURES 12–19 when placed in the positions indicated in FIGURE 21 illustrate, in detail, the second switching unit which is comprised of two crossbar switches #2 and #3;

FIGURE 20 illustrates the control relays which are operated by the signal output of the second switching unit, and which, in turn, control the engine control circuit; and FIGURE 21 is an assembly diagram of FIGURES 6–20.

GENERAL DESCRIPTION OF SYSTEM

Figure 1:
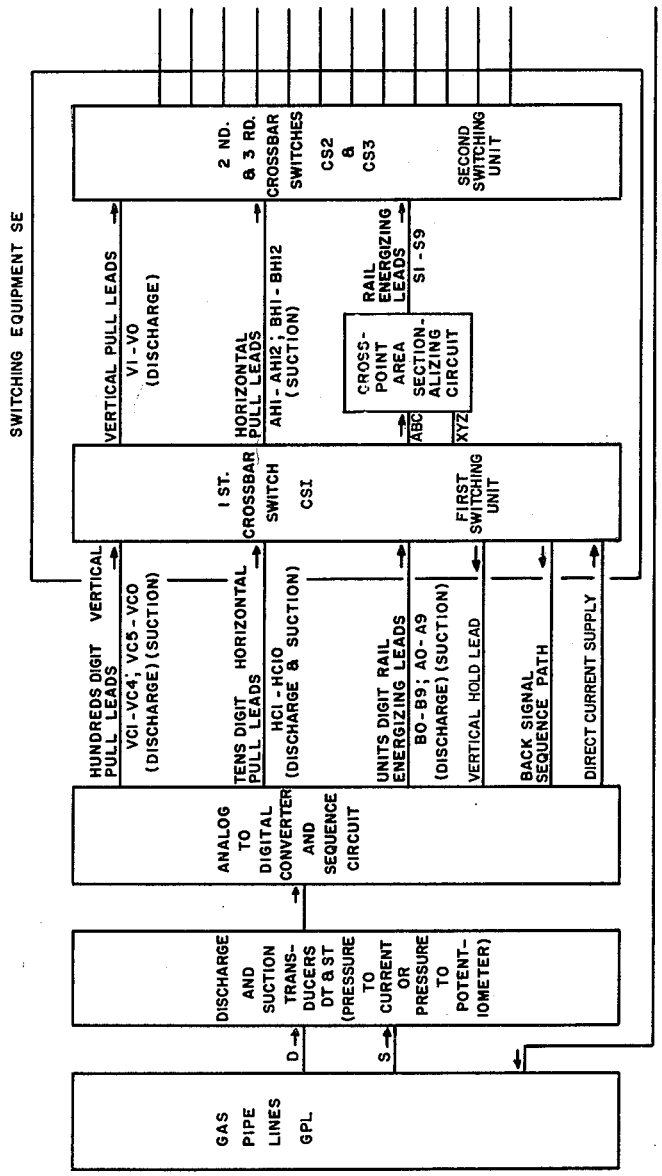
Figure 2:
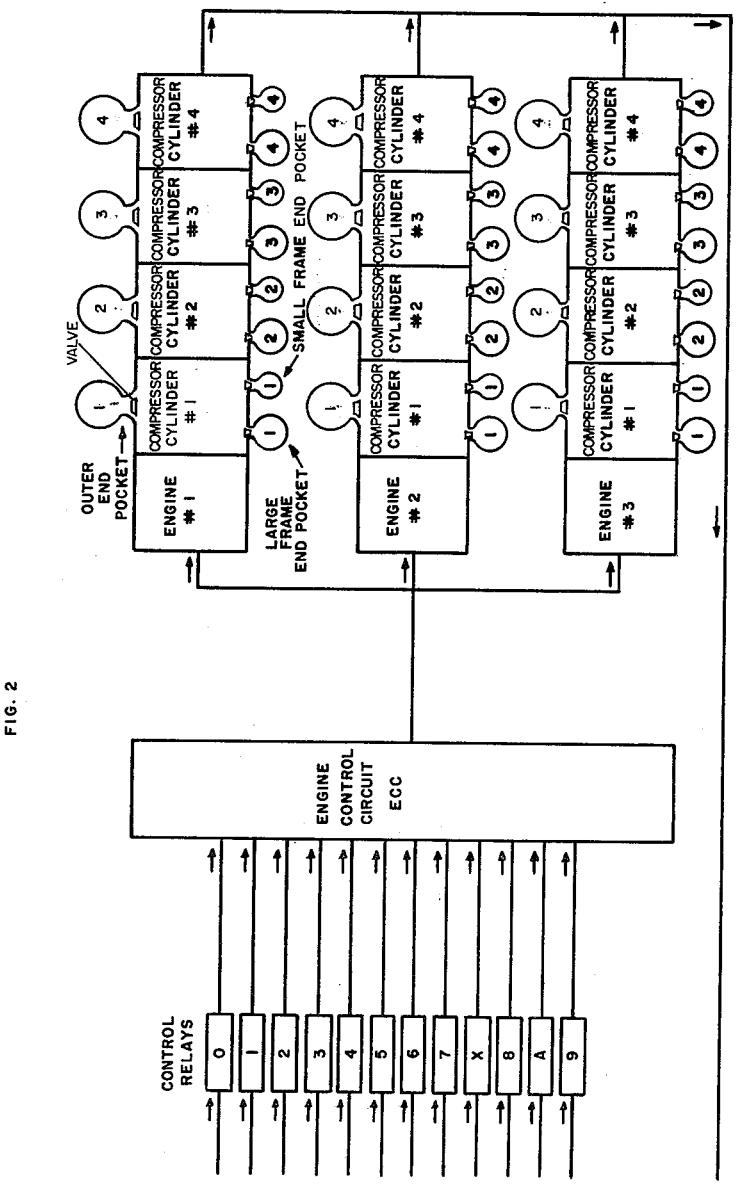

With reference to FIGURES 1 and 2, a gas distribution system having a gas compressor station which includes the novel switching equipment of the invention is shown in block form thereat. As there shown, discharge and suction transducers DT and ST are connected to the gas pipelines GPL at the compressor station and are operable to continually provide pressure to current (or pressure to potentiometer) output signals representative of the pressure conditions in the suction and discharge lines to an analog to digital converter, ADC and associated sequence circuit. The ADC converter may be of the type shown in the copending application Ser. No. 170,567 to Whelpley, Bartoseski, Breese and Hinkle, which was filed Feb. 2, 1962, and assigned to the assignee of this invention. The ADC converter converts the analog signals to digital signal outputs for coupling over four different sets of conductors A0–A9 (suction units digits), B0–B9 (discharge units digits), VC1–VC0 (hundreds digits) and HC1–HC0 (tens digits) to the input circuit for the novel switching equipment.

The switching equipment SE basically comprises three crossbar switches, different crosspoints of which are preassigned to represent different combinations of suction and discharge pressures, and further to provide output signals which provide a predetermined control of the engines which has been preselected for such pressure conditions. A feature of the invention is the manner in which such selections may be prewired into the switches to conform to preferred operating curves for the system, and further the manner in which the novel switching equipment permits connection of the equipment to provide different conditions of operation on a non-linear basis, i.e., finer control in more critical areas, and coarser control in less critical areas.

The interconnection of the input circuit for the switching equipment to the analog to digital converted ADC basically comprises three sets of conductors for transmitting three digit numbers representative of the existing suction and discharge pressure to the switching equipment. As shown, the first set (VC1–VC4, VC5, VC0) is used to transmit the hundreds digits of the numbers representative of the discharge and suction pressures, the second set (HC1–HC10) is used to transmit the tens digit of such numbers, and the third set (B0–B9 and A0–A9) is used to transmit the units digits of such numbers. Additional control conductors extending between the converter ADC and the switching equipment include the vertical hold lead, the back signal sequence path, and the direct connect power supply conductors.

The output circuits of the switching equipment comprise conductors S1–S12, which extend to control relays P0–P7, X, 0, I and G. Each control relay is in turn connected to the engine control circuit ECC, and is operative as energized, to control the engine control circuit to provide a predetermined operating condition of the engines, different control relays effecting different operating conditions.

Although various types of engine control may be controlled by the control relays P0, P7, X 0, I and G in the illustrated embodiment, the control relays are connected to effect variation of the number of engines which are operative at a given time, the number of pockets in each compressor engine which are affected, and the valves in each pocket which are opened and closed.

The illustrated station includes three engines 1, 2, 3 which are in turn connected to operate three compressor engines each of which has four pumping cylinders. As shown in FIGURE 2, each compressor engine pumping cylinder has an outer end pocket, a smaller frame end pocket and a large frame end pocket. Opening of the pockets increases the volume of the pumping chamber, and in turn, reduces the rate of pressure rise against the piston rod of the compressor cylinder to effect a like reduction in the amount of gas being pumped. In a similar manner, closing of the pockets reduces the volume of the pumping cylinder to increase the rate of pressure rise against the piston rod of the compressor cylinder to effect a resultant increase in the amount of gas being pumped. Opening and closing of the pockets is accomplished by movement of the valves illustrated by mechanisms (not shown), as controlled by the engine control circuit ECC.

The outer end pocket is on the side of the piston opposite the piston rod, and the small frame end pocket and large frame end pockets are on the side of the piston on which the piston rod is located.

Intakes to the various compressor cylinders of the different engines are connected in parallel, and the outputs from the various compressor cylinders of the different engines are also connected in parallel. Therefore, the opening or closing of any pocket for one compressor cylinder affects the rest of the pumping cylinders.

GENERAL DESCRIPTION OF SWITCHING EQUIPMENT

As noted above, in the operation of the gas compressor stations, it is necessary to protect the compressors as well as the associated driving engines against overload and the consequent results thereof.

One of the more basic problems associated with automatic compressor stations is caused by the difficulty which exists in automatically recognizing an approaching overload condition so that appropriate compensating control may be effected before damage occurs. Calculation of the horsepower of the engine from the engine speed is one attempt, for example, which did not appear practical. As a result of various other attempts, the most reliable and practical solution to such problem appears to be the utilization of specific data from the engine-compressor manufacture to prepare a graph which is used as the basis for prewiring electrical equipment to provide predetermined operating conditions for predetermined combinations of discharge and suction pressures in the system.

Figure 3:
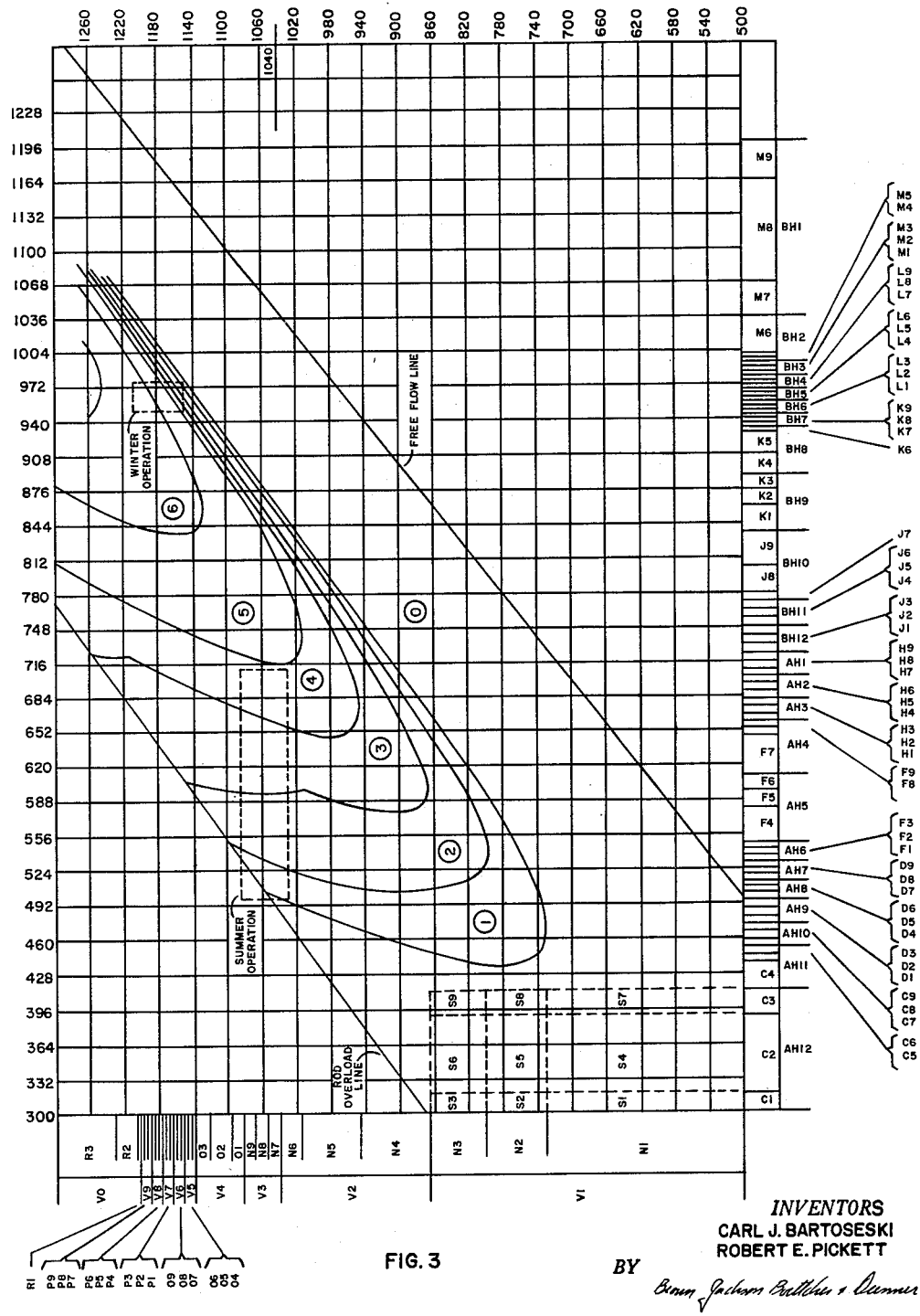
FIGURE 3 is a graph of engine pocket configuration protection curves versus suction and discharge pressures, the left and bottom edges of FIGURE 3 being marked to indicate control equipment assignments for recognizing the various areas of FIGURE 3 whereby suitable controls and reporting may be effected.

With reference to FIGURE 3, a graph based on a preferred engine operating condition for one type of engine is shown thereat. Suction pressures are shown as linear gradations along the horizontal axis over a range from 300 to 1295 p.s.i., the distance from one grid line to the next representing 32 p.s.i. Discharge pressures are shown as a linear gradation extending along the y axis over a range from 500 to 1300 p.s.i., the distance from one grid line to the next representing 40 p.s.i.

As noted heretofore, for a given combination of suction pressure and discharge pressure, the pockets of the three engines 1, 2, 3, schematically indicated in FIGURE 2, should be opened or closed in a prescribed pattern to protect the engines against overload. The areas of operation are shown in FIGURE 3 by the curves thereat which are plotted to indicate the areas represented by various combinations of suction and discharge pressures and the different combinations of pockets which should be opened and closed to provide preferred engine operation. A free flow line and a rod overload line are also shown thereat.

In the area designated "0" which extends between the rod overload line, the free flow line, and the lowermost curve, the pocket configuration "0" (no pockets open) is considered to be an acceptable engine operating condition. In the area extending between the two lowermost curves designated "1," pocket configuration No. 1 should be observed (the #1 outer end pocket on compressor engine operating should be open).

In the area designated "2," pocket configuration No. 2 should be observed, which means that the #1 and #2 outer end pockets on all compressors running should be open; in the area designated "3," pocket configuration No. 3 should be observed which means that the #1, #2 and #3 outer end pockets on all compressors running should be open; in the area designated "4," pocket configuration No. 4 should be observed which means that #1, #2, #3 and #4 outer end pockets on all compressors running should be open; in the area designated "5," pocket configuration No. 5 should be observed which means that #1, #2, #3, and #4 outer end pockets, the #4 small frame end pocket and #4 large frame end pocket on all compressors running should be open; and in the area designated "6," pocket configuration No. 6 should be observed which means that #1, #2, #3 and #4 outer end pocket, #3 and #4 small frame end pocket, and the #3 and #4 large frame end pocket on all three engines should be open.

The following chart summarizes such conditions.

| | | | | | | | |
|---|---|---|---|---|---|---|---|
| Circled number on chart | 0 | 1 | 2 | 3 | 4 | 5 | 6 |
| Total outer end pockets open | 0 | 1 | 2 | 3 | 4 | 4 | 4 |
| Total small frame end pockets open | 0 | 0 | 0 | 0 | 0 | 1 | 2 |
| Total large frame end pockets open | 0 | 0 | 0 | 0 | 0 | 1 | 2 |

Such data indicates the preferred manner of engine operation and the switching equipment disclosed hereat is connected to effect such control. However, a brief description of the relation of the chart to the engine operation is believed to be of assistance. With reference to the chart, it will be seen that if grid lines were drawn horizontally and vertically for every 1 p.s.i. change, a total of 995×800 or 796,000 square units covering the graph would be determined; but the problem of assigning a pocket configuration to each one individually would not be feasible equipmentwise. On the other hand, connection of the equipment to represent the grids which are 32 units apart on the horizontal, and 40 units apart on the vertical, would provide 1280 squares on the graph. These squares however would not provide fine enough resolution in some places (such as the "winter area") and would provide resolution of too fine a value in some other areas (such as the area shown in the lower left corner).

By way of example, in the initial starting of the engine, the engine performance will generally follow a line perpendicular to the free flow line. If such a line passes through the area designated "winter area" on the chart, the control equipment is required to change the pocket configurations of the engines with only slight changes in the value of the suction and discharge pressures, and very fine resolution is required in this area.

According to the invention fine resolution of such order is provided where necessary and a more coarse resolution is provided in less critical operating areas, and such feature is referred to as non-linear or non-uniform programming of the engine operations.

In providing such manner of operation, suction pressures are divided from 300 p.s.i. to 1200 p.s.i. into 72 finer nonuniform gradations according to resolution required. These gradations are designated on the chart (from left to right) C1–C9, D1–D9, F1–F9, H1–H9, J1–J9, K1–K9, L1–L9, and M1–M9. Every three of these finer gradations is labeled as a coarser gradation and comprises the horizontal dimension of an area, the twenty-four coarser gradations being designated from left to right, as AH12–AH1, BH12–BH1.

Discharge pressures from 500 p.s.i. to 1300 p.s.i. are divided into 30 finer non-uniform gradations according to resolution required, the gradations being designated from bottom to top as N1–N9, O1–O9, P1–P9, R1–R3. Every three of these finer gradations is labeled as a coarser gradation and comprises the vertical dimension of an area, the ten coarser gradations being designated from bottom to top as V1–V0.

The crossing of the coarser gradation lines determine 10×24 or 240 large rectangular areas (only one of which is shown in FIGURE 3) each large rectangular area having therein nine smaller rectangular areas determined by the finer gradation lines. For example, with reference to the lower left hand corner of FIGURE 3, the larger suction gradation AH12 and the larger discharge gradation V1 determine the larger rectangular area illustrated thereat by dotted lines. Within this larger rectangular area, nine smaller rectangular areas S1–S9 are determined by the three finer suction gradations C1, C2, C3 and the finer discharge gradations N1, N2, N3. Each of these smaller rectangular areas would be assigned pocket configuration No. 0 because it is in the pocket configuration No. 0 general area. If a smaller rectangular area should overlap two or more pocket configuration areas, in general, it is assigned to the pocket configuration area of the highest number found therein.

Each larger rectangular area in the chart is divided into nine smaller rectangular areas S1–S9 oriented in the manner of the illustrated area. It can be seen that fine resolution is provided for suction pressure from K6 to M5, and for discharge pressure from O4 to R1, such area being located in the general region identified as "winter operation" and being the condition which may be experienced in the winter season.

Fine resolution is also provided for suction pressures from C5 to F3 and from F8 to J7, and for discharge pressures from N6 to O1 to cover the changes of curves in the "summer operation," which are conditions which the compressors may experience in the summer season.

Below and to the right of the free flow line on FIGURE 3 pressures are such that gas can flow without being pumped, and hence no pockets need be open in this area. Above and to the left of the rod overload line on FIGURE 3, pressures are such that piston rods are overloaded due to torque overload.

Figure 4:
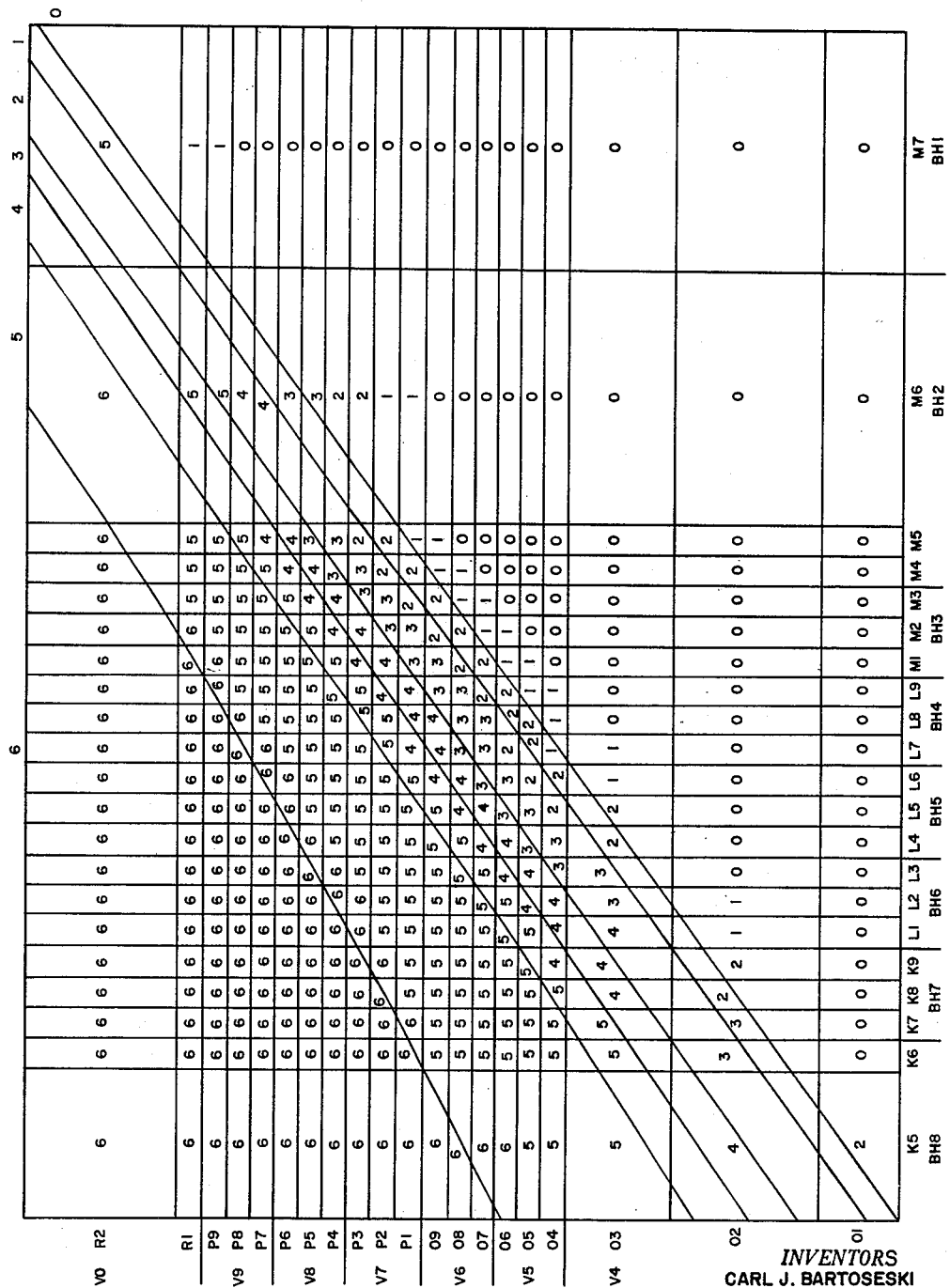
FIGURE 4 is an enlarged portion of FIGURE 3 showing in more detail the manner in which area assignments are made.
Figure 5:
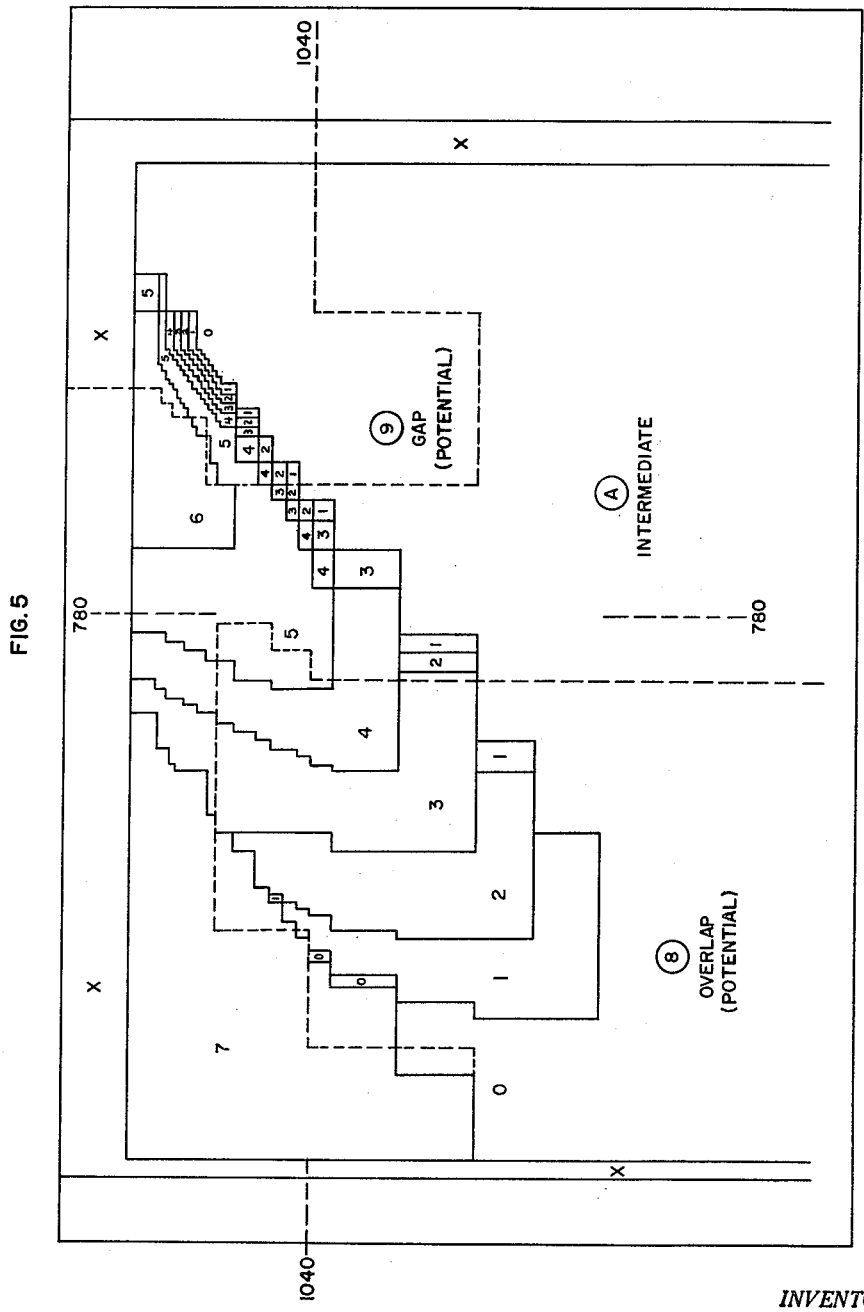
FIGURE 5 is a graph illustrating area assignments of FIGURE 3.
Figure 7:
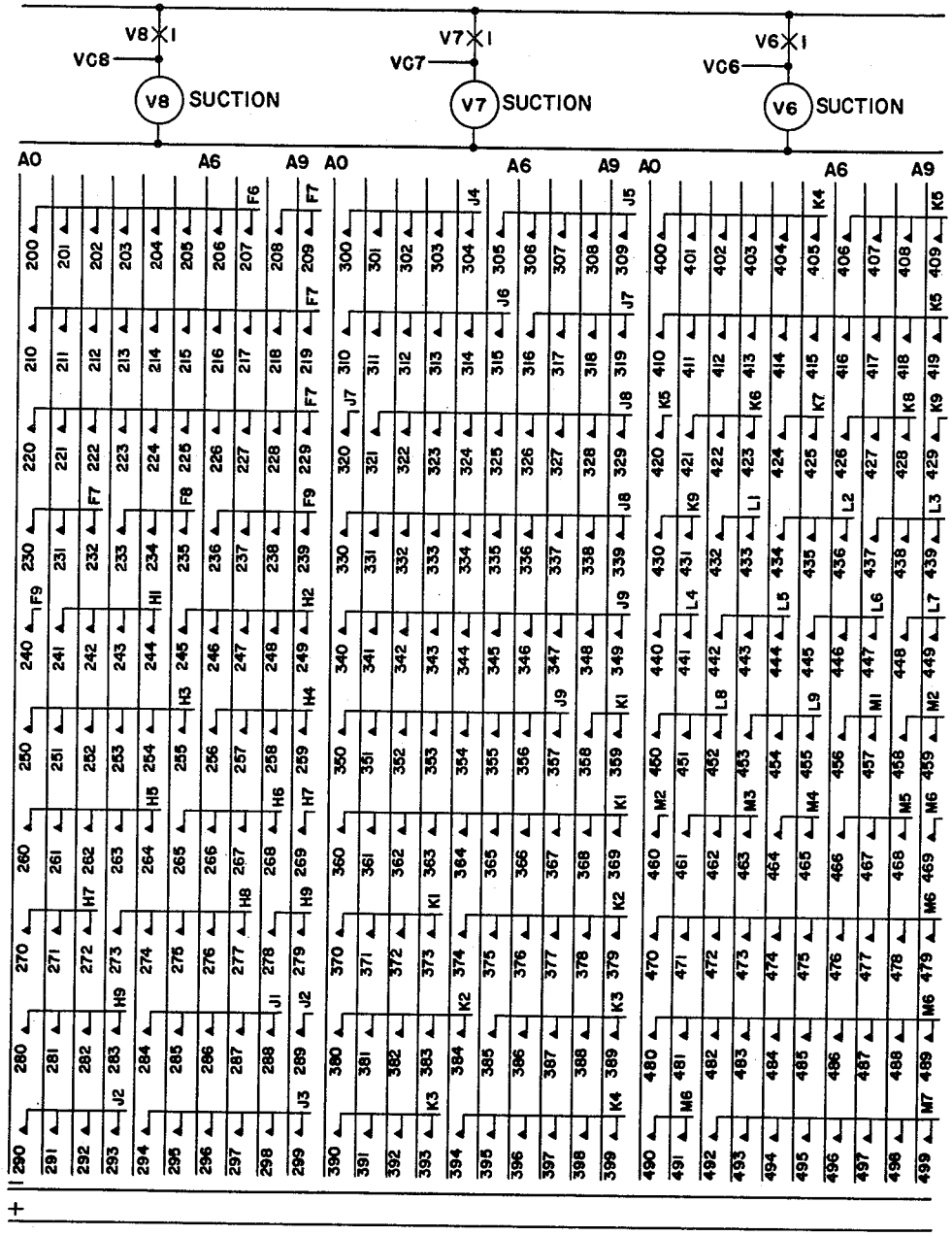

The assignment of pocket configurations to small areas will be further apparent by reference to FIGURE 4 which is an enlargement of the upper right portion of FIGURE 3 with the coarser and finer gradations determining rectangular areas as shown. Lumping together the small areas having the same assignment of pocket configurations, it will be seen, with reference to FIGURE 5, that irregular larger common pocket configuration areas are labeled 0–6. The area designated "beyond normal scope of control" in FIGURES 5 and 7 represents an area generally beyond the rod overload line, and small rectangular areas in this general area are assigned the digit 7.

The area designated "shutdown area of matrix" is identified by the letter "X" and small rectangles in this general area are assigned the digit X. The general area 8 defined by dotted lines and embracing various other areas is a potential overlap area, and the general area 9 defined by the dotted lines (and embracing various other areas) is a potential gap area, and the general area A taking in the area other than areas X, 8 or 9 and embracing various other areas, is an intermediate normal operation area having no potential overlaps or gaps.

In implementing the assignments of FIGURE 3, switching equipment including a crossbar switch CS1 and two crossbar switches CS2, CS3 are connected, as shown in FIGURE 6. For purposes of simplifying the explanation, reference is first made to the connection of the two crossbar switches CS2, CS3 which are connected to implement the switching dictated by the charted conditions set forth above.

With reference to FIGURES 12–19, the two crossbar switches CS2, CS3, as shown, are interconnected with corresponding vertical magnets in the two switches being connected for operation in parallel. As a result crossbar switches #2 and #3 comprise a composite switching unit (designated the second switching unit) having in effect only ten verticals but 24 horizontals or 24×10=240 crosspoints or switching positions. Each vertical comprises ten metallic "rails"; and each "crosspoint" determined by a given vertical and horizontal comprises ten contacts which may be closed against the vertical rails.

Magnets V1–V0 of the second switching unit are assigned to coarser gradations V1–V0 along the left side of FIGURE 3; horizontal magnets having inputs BH1–BH12 and AH1–AH12 in the second switching unit are assigned to coarser gradations BH1–BH12 and AH1–AH12 along the lower edge of FIGURE 3.

Each of the 240 crosspoints determined by the verticals and horizontals of the ten switches corresponds to, and is assigned to, represent a larger rectangular area on FIGURE 3. The first nine contacts of each ten contacts of each crosspoint represents one of the nine smaller rectangular areas (or sub-areas) within the larger rectangular area represented by the crosspoint (or area switching position). The sub-area represented may be determined by the designation of the rail against which the contact closes. Thus if the contact closes against rail S1, then small area S1 is represented by contact S1.

The second crossbar switching unit set forth in FIGURES 12–19 may be readily oriented with respect to FIGURE 3, by turning FIGURE 21 sideways with the inventor's name in the lower left corner. Suction pressure will then be found to increase from left to right (as in FIGURE 3), and discharge pressure will be found to increase from bottom to top (as in FIGURE 3).

Thus, the first larger rectangular area determined by vertical V1 and horizontal AH12 will be found in the lower left corner of FIGURE 3, and in FIGURE 19, this larger rectangular area will be represented by the crosspoint or switching position determined by vertical magnet V1 and horizontal magnet AH12. The smaller rectangular area S1 within this larger area will be represented by the first contact which closes against rail S1. The area S2 of FIGURE 3 will be represented by the second contact in this crosspoint which closes against rail 2, etc. through the ninth contact. The tenth contact in this crosspoint which closes against rail 48P is used to represent and mark the fact that the larger area 8 is in the potential overlap area as seen in FIGURE 5, and the number 8 therefore appears in FIGURE 19 beside contact SN.

Referring again to FIGURES 3 and 5, it can be seen that smaller area S1 of FIGURE 3 is in the X region, as shown in FIGURE 5. Therefore the letter X will be found beside the contact S1 in FIGURE 19. Small areas S2 and S3 are similarly located and identified. As all the other small areas S4–S9 (as shown in FIGURE 3) are in the 0 pocket configuration area, the digit 0 is located beside the associated contact in FIGURE 19.

It will be further apparent that in the illustrated area (FIGURE 3) the gradations C1, C2, and C3 embrace suction pressures as follows:

|  | P.s.i. |
|---|---|
| C1 | 300 to 316.5 |
| C2 | 316.5 to 388.5 |
| C3 | 388.5 to 412.5 |

Thus, gradation AH12 which is comprised of gradations C1–C3 embraces suction pressure from 300 to 412.5 p.s.i. (i.e. C1, C2, and C3) and gradation V1 which embraces gradation N1, N2, and N3 embraces discharge pressures 500 to 864 p.s.i. That is:

|  | P.s.i. |
|---|---|
| N1 | 500 to 730 |
| N2 | 730 to 800 |
| N3 | 800 to 864 |

In the crossbar switch therefore, the input to vertical magnet V1 (FIGURE 19) is connected to be representative of a discharge pressure of 500–864 p.s.i. (i.e. N1, N2, and N3); the input to horizontal magnet H12 (FIGURE 16) is connected to be representative of a suction pressure 388.5 to 412.5 p.s.i. (i.e. C1, C2, C3); and the input to rail S1 associated with area S1 is connected to be representative of a suction pressure of from 300 to 316.5 p.s.i. (i.e. C1) and a discharge pressure of from 500 to 730 p.s.i. (i.e. N1).

As shown in FIGURE 19, the vertical input to vertical magnet V1 is connected to the signal coupling circuit having input circuits labeled N1, N2 and N3. The input circuit to horizontal magnet H12 (FIGURE 16) is connected to the lead AH12 (FIGURE 10) which emanates from a signal coupling circuit having an input identified as C1, C2 and C3. The input to rail S1 of crosspoint of vertical V1 is connected to conductor S1 (FIGURE 11) which can be traced back over make contacts of relays X and A, relay X being pulled by N1 and relay A by C1.

The area signal coupling circuits including input circuits, such as C1, C2, C3 and N1, N2 and N3 are associated with the first crossbar switch CS1 of the switching equipment and are now described in more detail hereat.

Referring to FIGURES 6–9, the first switching unit CS1 comprises a crossbar switch, and the input circuit C1 of the signal coupling circuit for AH12 is connected to crosspoint positions labeled 000–011; input circuit C2 is connected to crosspoint positions labeled 012–059; and input circuit C3 is connected to crosspoint positions labeled 060–075.

Figure 8:
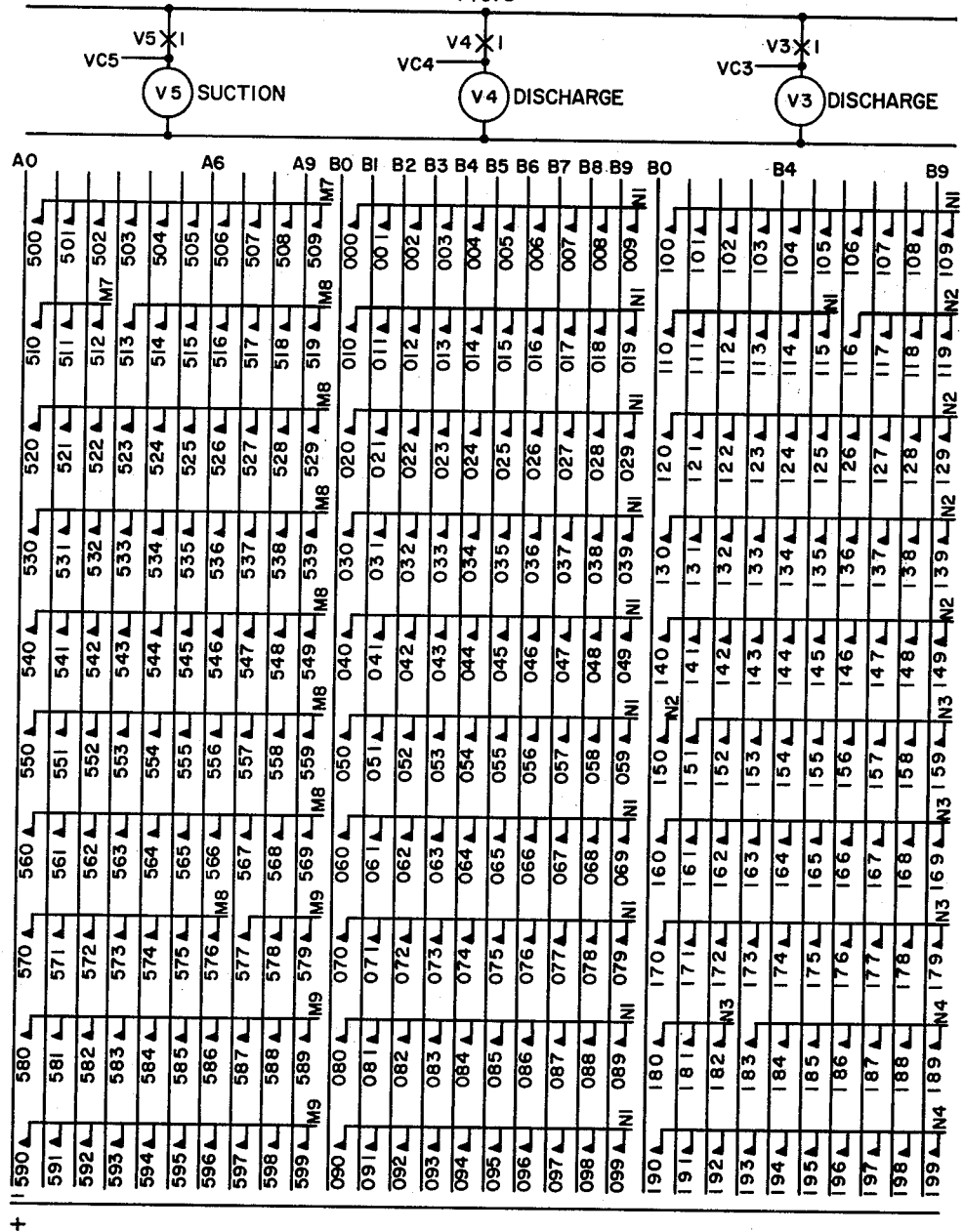
Figure 9:
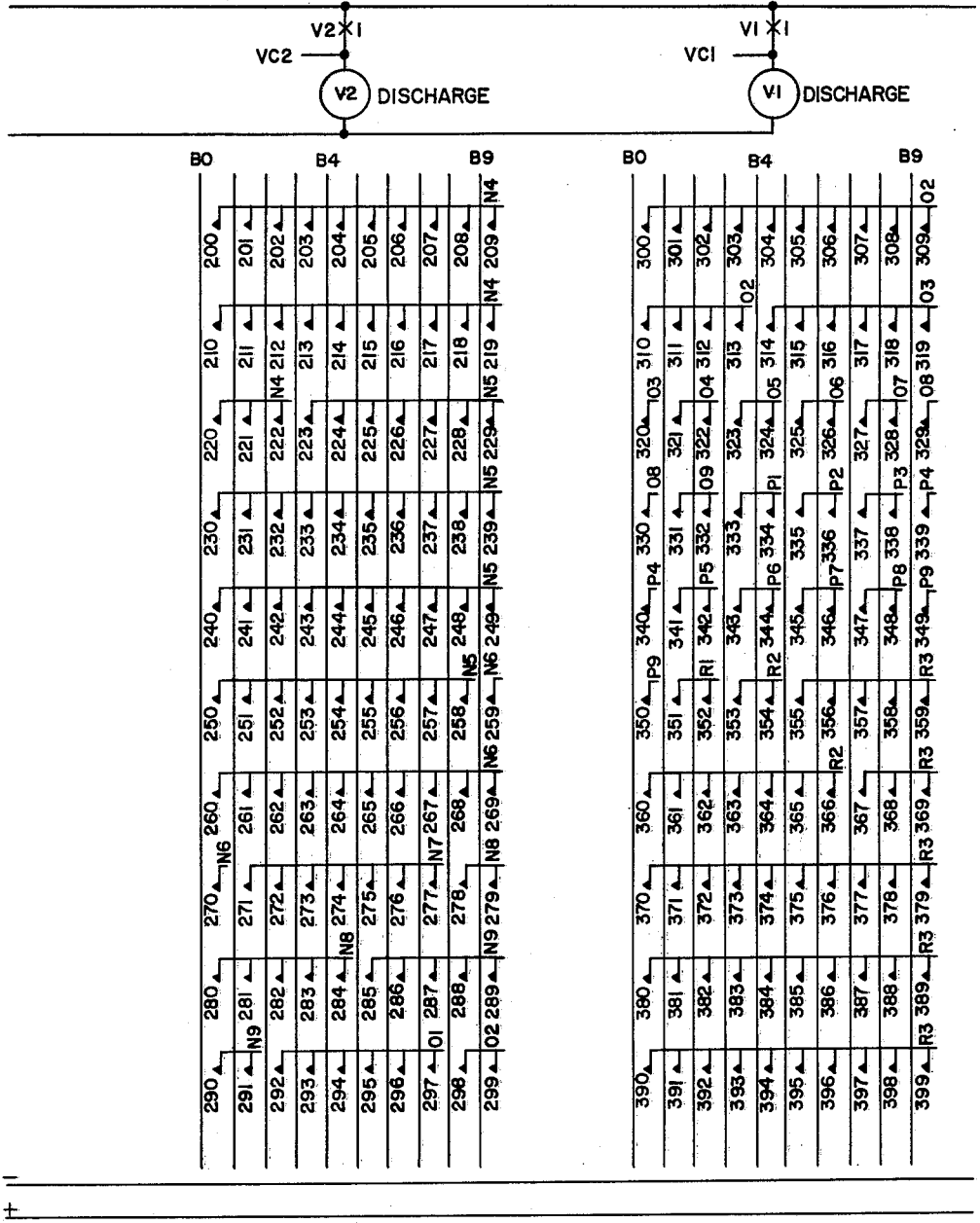

Referring to FIGURE 8, input circuit N1 for the area signal coupling circuit for vertical magnet V1 is connected to crosspoint positions labeled 000–015; input circuit N2 is connected to crosspoint positions labeled 116–150; and input circuit N3 is connected to crosspoint positions labeled 151–182.

The relation between the input circuits, such as C1, and the pressures represented thereby is as follows:

Input circuit C1 is connected to 000–011; if 11 is multiplied by 1½ and added to 300, the result will be 316.5.

Input circuit C2 is connected to 012–059; if 059 is multiplied by 1½ and added to 300 the result will be 388.5.

Input circuit C3 is connected to 060–075; if 075 is multiplied by 1½ and added to 300 the result will be 412.5.

Input circuit N1 is connected to 000–015; if 015 is multiplied by 2 and added to 500 the result will be 530.

Input circuit N2 is connected to 116–150; if 150 is multiplied by 2 and added to 500 the result will be 800.

Input circuit N3 is connected to 151–182; if 182 is multiplied by 2 and added to 500, the result will be 864.

At this point, it appears that a more complete description of the first crossbar switch and its function will be of assistance.

The crossbar switch CS1 basically comprises ten vertical magnets and ten horizontal magnets, the combination of which controls the selective operation of each of one hundred crosspoints.

The input circuits to the switch CS1 are connected over conductor sets A0–A9, B0–B9, VC0–VC9, and HC1, HC10 to the output circuits of the analog to digital converter ADC. The converter ADC provides a first three digit number representative of the suction pressure and a second three digit number representative of the discharge pressure.

The hundreds digits of the suction pressure number and discharge pressure number are transmitted over conductors VC0–VC9, the tens digit of both numbers transmitted over the conductors HC1, HC10, the units digit of the suction pressure number is transmitted over conductor A0–A9 and the units digit of the discharge pressure number is transmitted over conductor B0–B9.

As shown in FIGURE 6, the vertical magnets V0–V5 are used to represent suction pressures and are connected to leads VC0–VC5, whereby the hundreds digit in the suction pressure number determines and effects operation of a vertical magnet assigned to represent such group. The horizontal selection magnets H1–H10 are connected to input leads HC1–HC10 and are connected to represent the tens digit of the pressure representative numbers received from the converter. The rails A0–A9 for each vertical magnet V0–V5 are connected to the units input conductors A0–A9, and each rail is thereby assigned to represent a different units digit.

In a similar manner, vertical selection magnets VL1–V1 of the crossbar switch are pulled over hundreds leads representing discharge pressure, horizontal selection magnets H1–H0 are pulled over tens leads representative of discharge pressure, and rails B0–B9 are energized over units leads representative of discharge pressure.

Thus, each crosspoint in the switch represents a suction pressure or a discharge pressure. However, it should be appreciated by reference to FIGURE 1 that the suction pressure digits from the analog-to-digital converter ADC are derived from a transducer which has an output in which one unit is representative of 1½ p.s.i. of suction pressure, and the discharge pressure numbers are derived from a transducer having an output in which one unit is representative of 2 p.s.i. of discharge pressure. Thus, to further illustrate the above example in which digits 059 are received as a representation of suction pressure 388.5, conductors HC5, VC0 and A9 are energized to select the crosspoint 059 (FIG. 6), and conductor C2 in the signal coupling circuit is marked to enable selection magnet AH12 in the second switching means.

The discharge pressure representing selection means V1–V4 in the switch CS1 (FIGURES 8 and 9) is similarly connected and operative with horizontal selection means H1–H10 and rails B0–B9 to effect selection of the different crosspoints as the signals representing the various discharge pressures are received from the converter ADC.

GENERAL DESCRIPTION OF SEQUENCE OF OPERATIONS IN SYSTEM

With reference to FIGURES 1 and 2, it will be recalled that the suction and discharge pressures of the gas pipeline controlled by the local compressor station are transduced from pressure to current or from pressure to a slider position on a potentiometer as an analog input signal to analog-to-digital converter equipment.

The analog-to-digital converter equipment changes the analog signals to digital signals. By means of sequence circuitry, when certain prescribed deviations or other conditions have occurred, the sequence circuitry feeds these digital signals sequentially to the first switching unit comprising the first crossbar switch CS1. The sequence circuit first selectively energizes one of the units digit rail energizing leads A0–A9, and one of the tens digit horizontal pull leads HC1–HC10. The one of the units digit rail energizing leads thus marked effects energization of a single rail corresponding thereto in each of the vertical rows associated with said magnets V5–V0 of the first crossbar switch CS1 to register the units digit representative of suction pressures therein; and the energized tens digit horizontal pull lead operating the corresponding horizontal magnet of the group H1–H10 in the first crossbar switch CS1 to register the tens digit representative of suction pressure therein.

In response to such selection, a signal is transmitted from the first crossbar switch over the back signal sequence path to the sequence circuit, notifying the sequence circuit that a horizontal coil of the first crossbar switch has operated, and that the crossbar switch CS1 is ready for operation of a vertical magnet of the group V5–V0 assigned to suction pressure representation.

Thereupon the sequence circuit selectively energizes one of the hundreds digit vertical pull leads VC5–VC0, operating the corresponding vertical magnet of the first crossbar switch to register the hundreds digit representative of suction pressure therein. The vertical magnet locks to the sequence circuit over the vertical hold lead, and effects operation of the associated crosspoint contacts previously prepared by the operation of the horizontal magnet. Thereupon the sequence circuit releases the horizontal magnet, but the crosspoint contacts in the operated vertical remain closed.

A three digit circuit representative of suction pressure is now completed through the one of the crosspoint contacts which is associated with the rail energized by the units digit to one of the area signal coupling circuits C1–C9, D1–D9, F1–F9, H1–H9.

There are a multiplicity of three digit representing circuits for suction pressures (600) at the output of the first crossbar switch CS1 (see C1 for example). The value of each of these six hundred circuits if multiplied by 1½ and added to the initial value of 300 on FIGURE 3 will give the associated position horizontally on the graph and the actual suction pressure. The location of the pressure represented by each circuit relative to the AH1–AH12 and BH1–BH12 gradations at the bottom of FIGURE 3 determines which one of the twenty-four horizontal pull leads AH1–AH12; BH1–BH12 of FIGURE 1 to which the three digits will be connected, and in turn the one of the twenty-four horizontal magnets AH1–AH12, BH1–BH12, of the second switching unit which will be energized thereby. Since each of the horizontal magnets is connected to a number of such three digit circuits (AH12 is connected to C1–C3, for example), each horizontal magnet in the second switch CS2 represents a range or spread of suction pressures.

In a similar manner the location of the value represented by each three digit circuit relative to the three finer gradations within the larger gradation determines which of three fine gradation leads A, B, or C to the "crosspoint area sectionalizing circuit" will be energized to mark a finer spread of suction pressure within the larger spread.

Upon the expiration of a timed interval in the sequence circuit, the sequence circuit selectively energizes one of the units digit rail energizing leads B0–B9 and one of the tens digit horizontal pull leads HC1–HC10; the energizing lead for the units digit rail effecting energization of a single rail corresponding thereto in each of the verticals V1–V4 of the first crossbar switch CS1 to register the units digit representative of discharge pressure therein; the energized tens digit horizontal pull lead of the group HC1–HC10 operating the corresponding horizontal magnet of the first crossbar switch CS1 to register the tens digit representative of discharge pressure therein.

In response thereto a back signal over the back signal sequence path is received from the first crossbar switch CS1 to the sequence circuit to indicate to the sequence circuit that a horizontal magnet of the first crossbar switch CS1 has operated, and that the crossbar switch is ready for a vertical magnet to be pulled.

Thereupon the sequence circuit selectively energizes one of the hundreds digit vertical pull leads VC1–VC4 to operate the corresponding vertical magnet of the group V1–V4 in the first crossbar switch CS1 to register the hundreds digit representative of the discharge pressure therein. The vertical magnet locks to the sequence circuit over the vertical hold lead.

The operation of the vertical magnet effects operation of the associated crosspoint contacts previously prepared by the operation of the horizontal magnet, and the sequence circuit releases the horizontal magnet, the crosspoint contacts in the operated vertical remaining closed.

A three digit circuit representative of discharge pressure is now completed over the one of the said crosspoint contacts which is associated with the energized rail to the signal coupling circuits N1–N9, O1–O9, P1–P9, R1–R3.

There are four hundred of such three digit circuits for the discharge pressure at the output side of the first crossbar switch CS1. The value of each of these 400 circuits if multiplied by 2 and added to the initial value of 500 on FIGURE 3 will give the associated position vertically on the graph signifying actual discharge pressure. The location of the value relative to the V1–V0 gradations at the left side of FIGURE 3 determines which one of the ten vertical pull leads V1–V0 of FIGURE 1 the three digit circuit will be connected to, and in turn, which one of the ten vertical magnets of the second switching unit will be energized. Since each vertical pull magnet is connected over a signal coupling circuit (FIGURE 10) to a plurality of the three digit representing circuits, each magnet represents a spread of discharge pressures.

In a similar manner the location of such value relative to the three finer gradations within the larger gradation determines which one of three fine gradation leads X, Y and Z to the "crosspoint area sectionalizing circuit" will be energized to mark a finer spread of discharge pressure within the larger spread.

The three finer gradations of suction pressure and the three finer gradations of discharge pressure enable the crosspoint area sectionalizing circuit to selectively energize one of nine rail energizing leads S1–S9 to the second switching unit to selectively energize one of the crosspoint contacts determined by the selected crosspoint. These nine leads correspond to nine finer gradation areas, such as areas S1–S9 of FIGURE 3, associated with each horizontal-vertical combination larger areas.

It can be seen that there are 10×24 or 240 large horizontal-vertical areas determined on FIGURE 3 and 30×72 or 2160 small areas. Generally speaking, each small area (S1–S9, as represented by a single crosspoint contact in the second switching unit CS2) is assigned a number by reference to the pocket configuration curves, rod overload line, and free flow line, and certain extremes of suction and discharge of FIGURE 3, as explained more fully with reference to FIGURES 4 and 5. Thus, to prevent overloading the engines at given values of suction and discharge pressures, the pocket configuration predetermined as not being a marked conductor is assigned to the small area defined by such values of discharge and suction pressure.

Each crosspoint contact which defines the sub-areas in the large areas in the second switching unit CS2 is connected to one of the control relays 0, 1, 2, 3, 4, 5 and 6 (FIGURE 2) to energize each relay as the crosspoint contact is energized. Relays 7, X, and 9 are concerned with shut down areas and beyond normal scope areas, relays 8, A, and 9 are concerned with potential gap, potential overlap, and normal operation reporting, and relays 0–6 are concerned with the extension of signals to the engine control circuit which controls the opening and closing of the pumping cylinder pockets of the compressor engines to prevent overloading the engines. The functions of such relays are described more fully hereinafter. Other circuitry not part of this invention, further controls the engines as to starting and stopping and speed, to thereby vary the effect of the pumping cylinders in the pressure in the gas pipelines.

Detailed Example of Control of the Engines for a Given Suction Pressure and Discharge Pressure Assuming for exemplary purposes that signals representative of suction pressure of 969 p.s.i. and a discharge pressure of 1168 p.s.i. in the system are coupled to the switching equipment SE, the equipment will operate the control equipment in the provision of pocket configuration 5 for the compressors.

It should be appreciated that the indication from the analog-to-digital converter means corresponding to 969 p.s.i. of suction pressure is 446 suction pressure units; and that the indication for 1168 p.s.i. of discharge pressure is 334 discharge pressure units (i.e., 446 suction pressure units ×1½+300=969 p.s.i. suction pressure; 334 discharge pressure units×2+500=1168 p.s.i. discharge pressure).

FIRST STEP

The sequence circuit of the analog-to-digital converter ADC and sequence circuit of FIGURE 1 connects positive potential to lead A6 which energizes each A6 rail in verticals V5–V0 of FIGURES 6–8 to register the units digit 6 of the number 446 which is representative of the suction pressure in the system.

The sequence circuit connects positive potential to lead HC5 (FIGURE 6) operating horizontal magnet H5 (FIGURE 6) over the path which extends from positive potential over lead HC5, coil of magnet H5, to negative potential over the negative lead. Operation of magnet H5 registers the tens digit 4 in the suction pressure representing number 446 to prepare for operation of its associated crosspoint contacts in all the verticals.

SECOND STEP

The "Ready for Vertical" circuit is closed as a back signal to the sequence circuit over contacts H51 (FIGURE 6).

THIRD STEP

Thereupon a signal is extended by the sequence circuit over conductor VC6 to operate vertical magnet V6 (FIGURE 7) and thereby register hundreds digit 4 of the number 446 which is representative of the suction pressure, the circuit extending over the path from positive potential over lead VC6 (FIGURE 6) to lead VC6 (FIGURE 7), the coil of magnet V6, back to the negative potential lead (FIGURE 6). Vertical magnet V6 operates and locks over contacts V6–1 back through FIGURE 6 to positive potential supplied over the vertical hold lead by the sequence circuit. The operation of vertical magnet V6 effects closure of the group of crosspoint contacts 440–449 as determined by relays H5 and V6. In that only rail A6 has positive potential connected thereto, the circuit extending over contacts 446 to lead L6 will be completed.

FOURTH STEP

Figure 16:
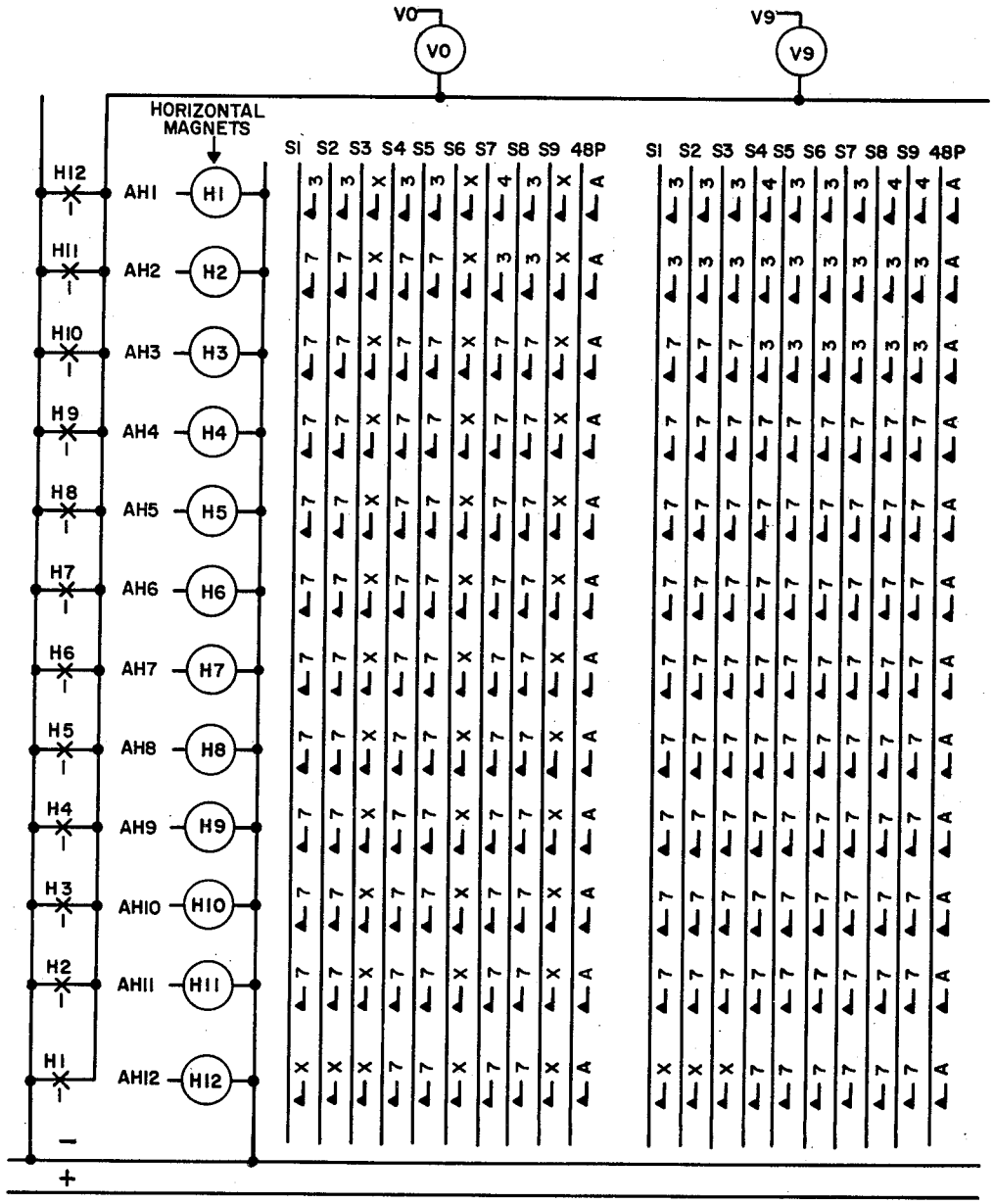
Figure 17:
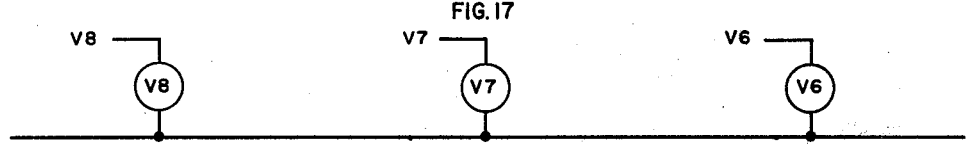
Figure 18:
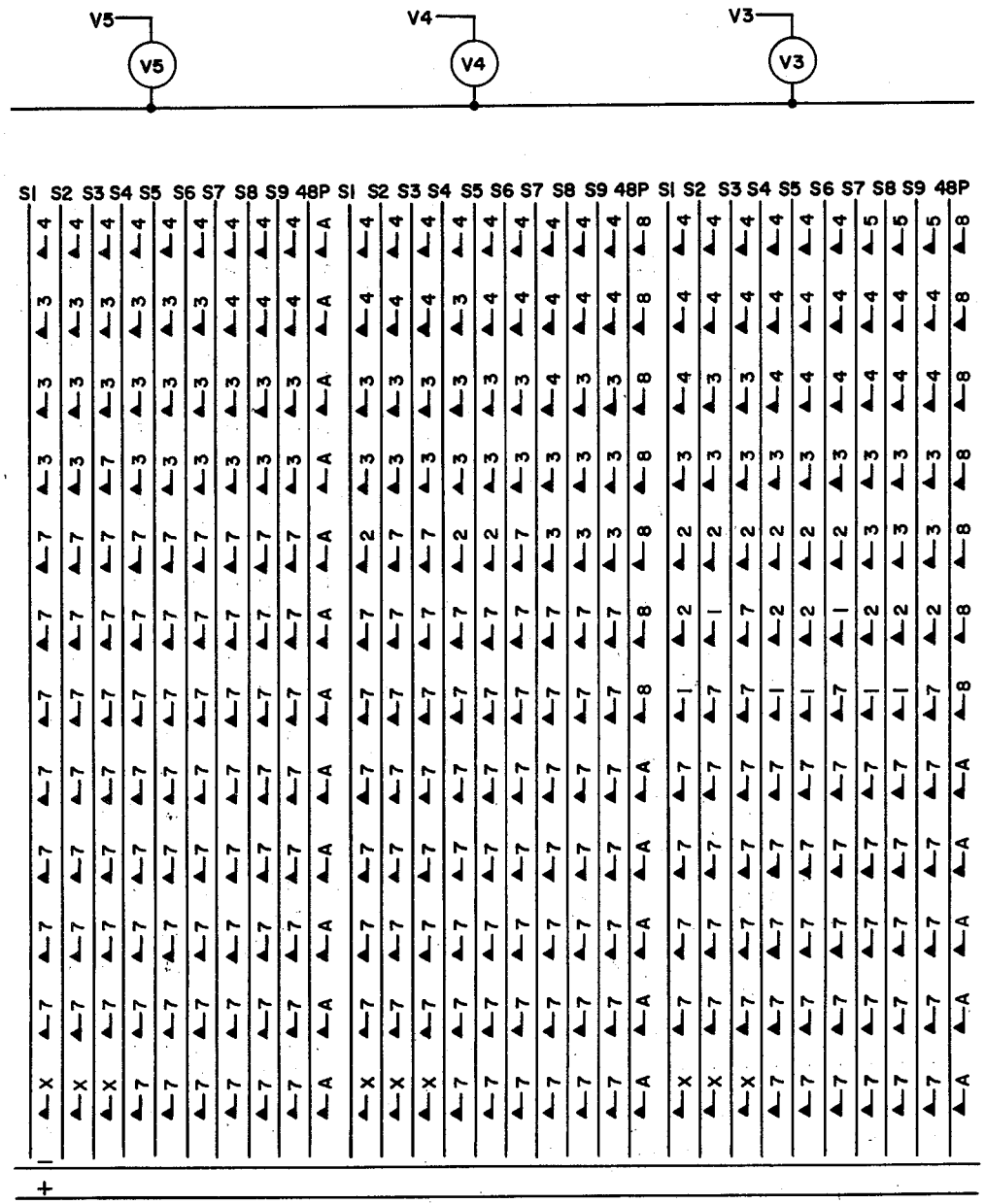

Positive potential over lead L6 (FIGURE 7) extends over lead L6 (FIGURE 10), a rectifier in the associated area signal coupling circuit (L4–L6), lead BH5 (FIGURE 10), to lead BH5 (FIGURE 12), the coil of magnet H5, through FIGURE 16 to the negative lead, to operate magnet BH5 which prepares the crosspoints in verticals V1–V0 (FIGURES 12–15).

Positive potential over lead L6 (FIGURE 7) is also extended over lead L6 (FIGURE 11), a rectifier in the associated sub-area signal coupling circuit through the coil of relay C to negative potential, operating relay C.

FIFTH STEP

After a timed interval, the sequence circuit removes positive potential from leads A6, HC5, and VC6, releasing horizontal magnet HC5; but magnet VC6 holds over the vertical hold circuit maintaining the operated crosspoint contacts to hold relay H5 (FIGURE 12) over lead BH5.

At this time the sequence circuit controls marking of the discharge pressure digits 334 on the switch by connecting positive potential to lead B4 which energizes each B4 rail in verticals V1–V4 (FIGURES 8 and 9) to register the units digit 4 of the discharge pressure number.

The sequence circuit also connects positive potential to lead HC4 (FIGURE 6) operating horizontal magnet H4 (FIGURE 6) over the path which extends from positive potential over lead HC4, the coil of magnet H4, to negative potential on the negative lead. The operation of magnet H4 registers the tens digit 3 of discharge pressure number 334 to prepare its associated crosspoint contacts in all verticals.

SIXTH STEP

The "Ready for Vertical" circuit is again closed, the circuit now extending over contacts H4–1 as a back signal to the sequence circuit.

SEVENTH STEP

Thereupon the sequence circuit operates vertical magnet V1 (FIGURE 9) to register hundreds digit 3 of the discharge pressure number 334, the path extending from positive potential over lead VC1 (FIGURE 6) to lead VC1 (FIGURE 9), coil of magnet V1, back to the negative potential lead (FIGURE 6). Vertical magnet V1 operates and locks over contacts V1–1 back through FIGURE 6 to positive potential supplied over the vertical hold lead by the sequence circuit. The operation of magnet V1 effects closure of the group of crosspoint contacts 330–339 as determined by magnets H4 and V1. As only rail B4 has positive potential connected thereto, a circuit will only be completed over contacts 334 to lead P1 in the area signal coupling circuit.

EIGHTH STEP

Figure 12:
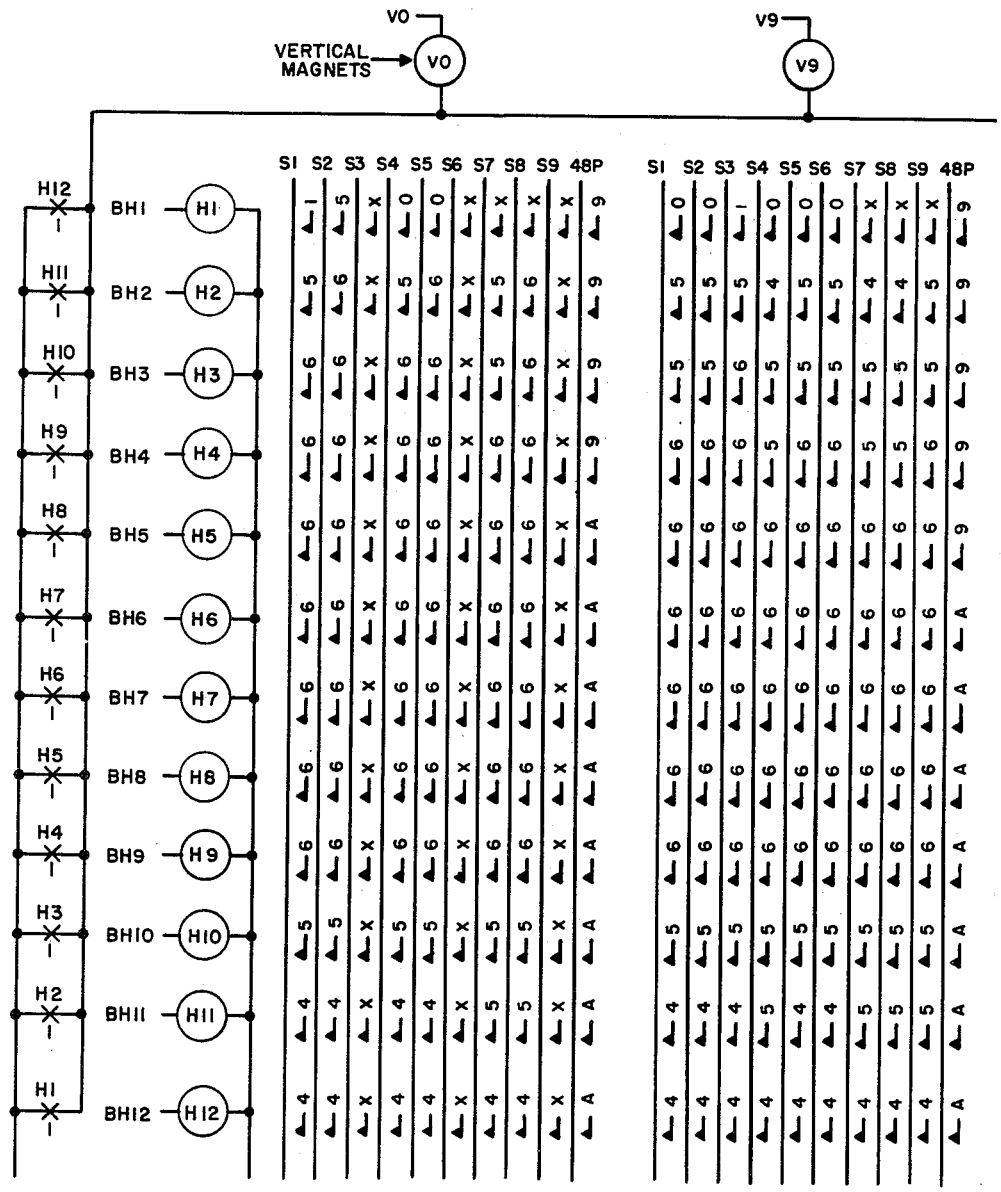
Figure 13:
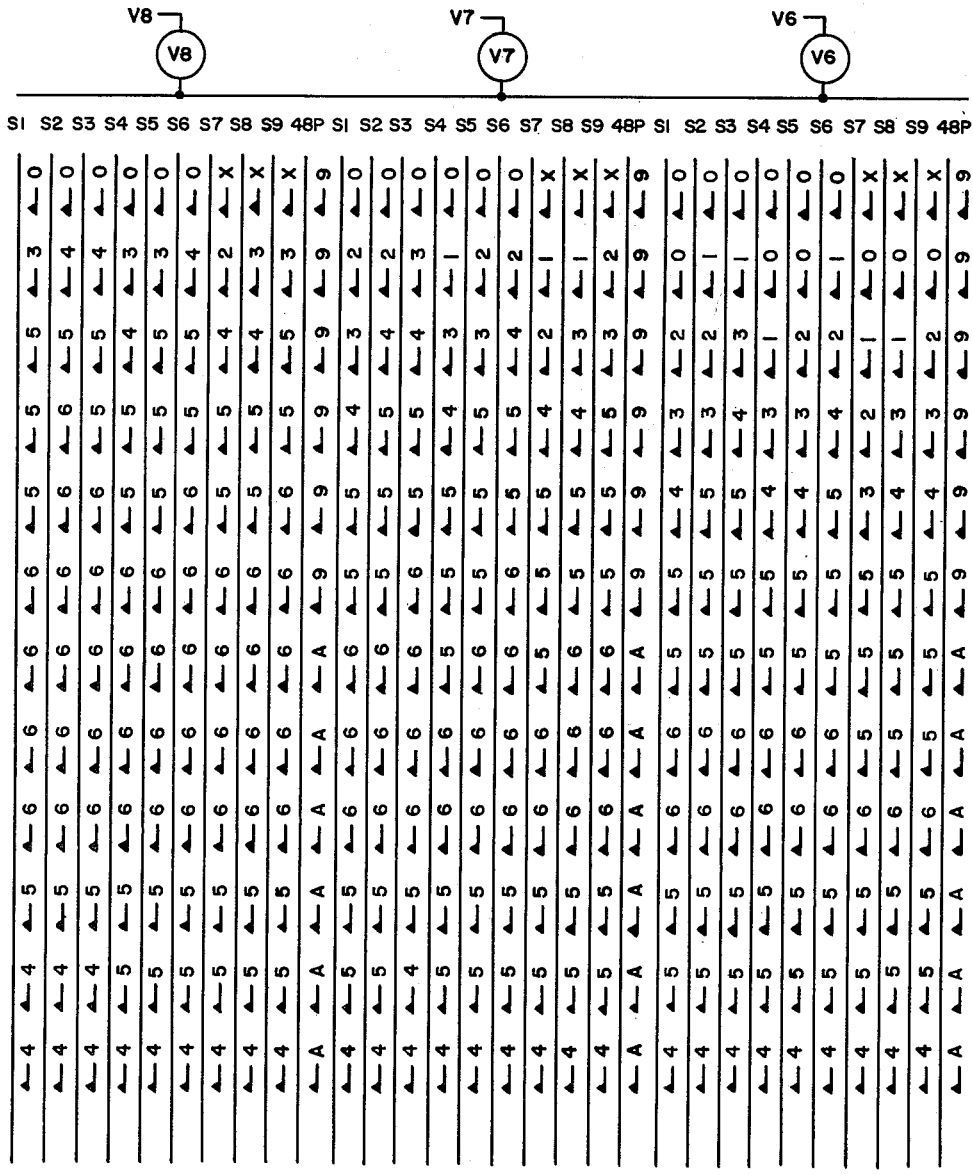

Positive potential over lead P1 (FIGURE 9) extends over lead P1 (FIGURE 10), a rectifier in the area signal coupling circuit for circuits P1, P2, P3, over lead V7 (FIGURE 10) to lead V7 (FIGURE 13), the coil of magnet V7, and back over FIGURE 12, and contacts H5–1 previously prepared by the operation of magnet BH5.

Positive potential over lead V7 (FIGURE 10) extends to lead V7 (FIGURE 17), through the coil of magnet V7 and back through FIGURE 16. However, the horizontal magnet H5 is energized in the other crossbar switch, and accordingly no circuit is completed for vertical magnet V7 and it does not operate.

Positive potential over lead P1 (FIGURE 9) also extends over lead P1 (FIGURE 11), a rectifier in a subarea signal coupling circuit and through the coil of relay X to negative potential. Relay X operates.

Referring to FIGURE 11, with relays C and X operated, a circuit is completed from positive potential through contacts C–1, and X–1 to lead S7, which lead is connected to conductor S7 in all verticals of FIGURES 12–19. Also positive potential over lead 48P is connected to each rail 48P in all verticals of FIGURES 12–19.

NINTH STEP

With horizontal magnet H5 (FIGURE 12) and vertical magnet V7 (FIGURE 13) operated, the ten contacts at the crosspoint associated with such magnets are operated.

TENTH STEP

Positive potential is connected over lead S7 (FIGURE 11) through rail S7 of vertical V7 (FIGURE 13), over lead 5 to lead 5 at the right side of FIGURE 19, over lead 5 (FIGURE 20), and through one winding of twin winding relay P5, and the coil of relay X3 to negative potential. Relay P5 operates and locks over the circuit extending from negative potential over break contacts Z1–3, X1–3, P03, P1–3, P2–3, P3–3, P4–3, P5–2, and the other winding of relay P5, contacts P5–1, P4–1, P3–1, P2–1, P1–1, P0–1, X1–1, and resistor R to positive potential.

Positive potential connected over lead 48P (FIGURE 11), through rail 48P of vertical V7 (FIGURE 13), over lead 9 at the right side of FIGURE 19, over lead 9 (FIGURE 20), and passes through a rectifier in the forward direction, and relay G (potential gap relay) to negative potential. Relay G locks over contacts I–1, 0–1, G–1, and resistor R to positive potential.

ELEVENTH STEP

Relay P5 operates and at its contacts P5–4 (FIGURE 20) closes a circuit to the engine control circuit (FIGURE 2) which controls the engines to operate in the No. 5 pocket configuration. Other contacts of relay P5 (not shown) light a local lamp indicator to indicate that the #5 pocket configuration is in use.

Referring to FIGURE 4, it can be seen that with selection magnets V7 and BH5 operated, and sub-area S7 determined by the energization of conductors P1 and L6, the selected area has the digit 5 therein. Although most of this small area is in the #4 pocket configuration area, a portion of the pocket is also in the #5 pocket configuration area. The #5 pocket configuration has been assigned thereto, so that those combinations of suction and discharge pressures which account for the upper left corner thereof would not be assigned a #4 pocket configuration.

Relay G operates and at its contacts G–4 (FIGURE 20) closes a circuit to the engine control circuit (FIGURE 2) which signals a potential gap situation to the engine control circuit, enabling it to use this information along with other information (not detailed herein) to determine whether an actual gap situation exists. If an actual gap situation does exist the engine control circuit initiates the reporting of the same locally and remotely (by means not shown herein).

The break-circuit holding paths of relays Z1–P6 insure that only one relay Z1—P6 may remain operated at a time. Similarly the break-circuit-operating paths of relays, G, 0, and I insure that only one relay G, 0, and I may remain operated at a time.

While single make contacts for each relay of FIGURE 20 are shown at the right of FIGURE 20, it should be understood that makes, breaks, transfers or combinations of these may control the engine control circuit.

Each of the relays P0–P6 of FIGURE 20 operate to control the pocket configuration operation of the engines, previously described, as follows:

P0—pocket configuration #0
P1—pocket configuration #1
P2—pocket configuration #2
P3—pocket configuration #3
P4—pocket configuration #4
P5—pocket configuration #5
P6—pocket configuration #6

Relay Z1 operates over lead 7 to signal the engine control circuit that the existing combinations of suction and discharge pressures is beyond the normal intended use of the engines and that the engine would be overloaded with all pockets open. As a result of such signal the control circuit shuts down the station and signals remotely that a rod overload shutdown has occurred. Relay Z1 also provides local lamp indications (not shown) that a rod overload shutdown has occurred.

With reference to FIGURE 3, for example, the small area represented by the intersection of N6 and C4 would fall in the region designated 7 in FIGURE 5 (i.e., with FIGURES 3 and 5 arranged in superposed relation). Such condition is represented (FIG. 19) by contacts associated with rail S3 in the crosspoints selected by vertical V2 and horizontal H11. It will be seen that the conductor attached to these contacts is labeled 7 and through the associated conductor 7 from FIGURE 19 into FIGURE 20 operates relay Z1 which closes its contacts Z1–4 to the engine control circuit to report this condition.

Relay X1 operates over lead X to signal the engine control circuit that the existing combination of suction and discharge pressures is such that the compressor station should be shut down. That is, with reference once more to FIGURE 3, the small area represented by the intersection of R3 and F5 is seen to fall within the region designated X in FIGURE 5. Referring to FIGURE 16, such position is represented by contacts associated with rail S6 in crosspoints determined by vertical V0 and horizontal H5. It will be seen that the conductor attached to these contacts is labeled X and extend from FIGURE 19 into FIGURE 20 to relay X1. Closure of the crosspoint operates relay X1 which closes its contacts X1–4 to the engine control circuit to report this condition, enabling the engine control circuit to shut the station down.

Relay 0 operates over lead 8 to signal the engine control circuit that a potential overlap condition exists. That is, by way of example and referring to FIGURE 3, the small area represented by the intersection of N6 and F5 falls in the general region of potential overlap designated 8 in FIGURE 5. Referring to FIGURE 19 this condition is represented by contacts associated with rail 48P in crosspoints determined by vertical V2 and horizontal H5. It will be seen that the conductor attached to these contacts is labeled 8, and that positive potential is extended over these contacts and conductor 8 from FIGURE 19 into FIGURE 20 through a rectifier in the forward direction and the winding of relay 0 to negative potential. Relay 0 operates and locks over contacts I–2, 0–2, G–2, and resistor R to positive potential, and at its contacts 0–4, extends positive potential to the engine control circuit to indicate the potential gap. If the engine control circuit determines as a result of receipt of this signal (as well as certain other indications) that an actual overlap exists, it shuts down one engine, raises the speed of the other engines and increases the load of the other engines.

Figure 14:
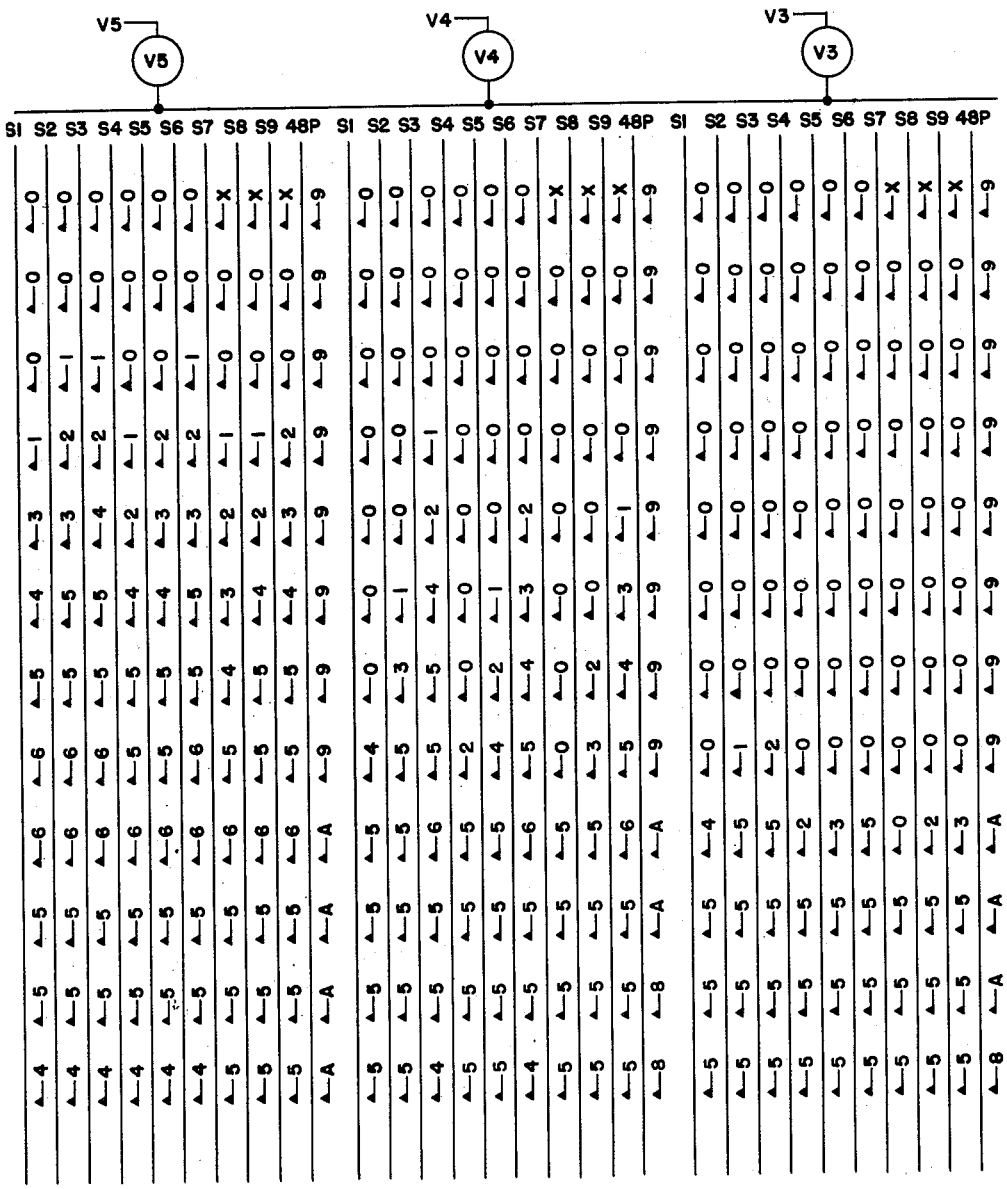
Figure 15:
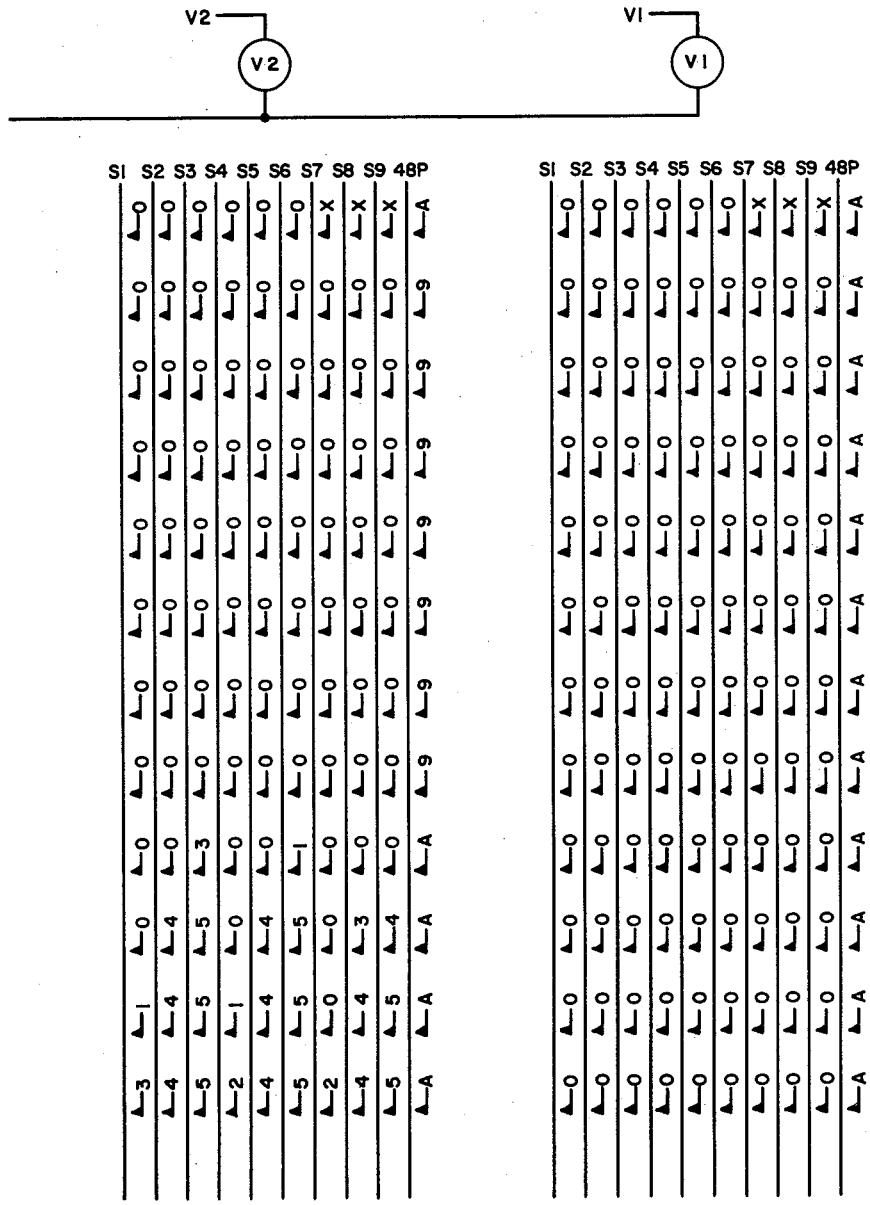

Relay I operates over lead A to signal the engine control circuit that neither potential gap or potential overload exist, but that an intermediate normal condition exists. That is, by way of example and referring to FIGURE 3, the small area represented by the intersection of 03 and J8 falls in the general intermediate region of normal operation designated A in FIGURE 5. Referring to FIGURE 14, such operation is represented by contacts associated with rail 48P in crosspoints selected by vertical V4 and horizontal H10. It will be seen that the conductor attached to these contacts is labeled A, and that positive potential is extended over these contacts and conductor A from FIGURE 19 into FIGURE 20 through a rectifier, and the winding of relay I to negative potential. Relay I operates and locks over contacts I–3, 0–3, G–2, and resistor R to negative potential, and at its contacts I–4, extends positive potential to the engine control circuit to notify the same that operation exists in the normal intermediate region.

Relay X3 operates whenever any of the relays Z1 to P6 operate, and at its contacts X1–4 extends positive potential to the engine control circuit for effecting operation related to functions other than described herein.

Although only certain particular embodiments of the invention have been shown and described, it is apparent that modifications and alterations may be made therein, and it is intended in the appended claims to cover all such modifications and alterations as may fall within the true spirit and scope of the invention.

What is claimed is:

1. In a pump control arrangement for controlling the operating condition of a plurality of engines which operate pump means for a system in accordance with the value of the suction and discharge pressures in the system, variable predetermined engine operating conditions being provided for various values of suction and discharge pressure, the improvement comprising input means having transducer means operative to provide analog signals representative of suction and discharge pressures in the system, analog to digital converter means connected to said input means operative to provide digital signals representative of the suction and discharge pressures in the system, means responsive to said digital signals to provide a suction range signal representing a predetermined range including the suction pressure represented by said digital signals, and a discharge range signal representing a predetermined range including the discharge pressure represented by said digital signals, and means responsive to said suction range signal and said discharge range signal to operate said engines in the preassigned conditions for said suction and discharge pressures.

2. In a pump control arrangement for controlling the operating condition of a plurality of engines which operate pump means for a system in accordance with the value of the suction and discharge pressures in the system, variable predetermined engine operating conditions being provided for various values of suction and discharge pressure, the improvement comprising input means having transducer means adapted to provide analog signals representative of suction and discharge pressures, analog to digital converter means connected to said input means for providing digital signals representative of the suction and discharge pressures in the system, means responsive to said digital signals to provide a suction range signal representing a predetermined range including the suction pressure represented by said digital signals, and a discharge range signal representing a predetermined range including the discharge pressure represented by said digital signals, means responsive to said suction range signal to provide a suction range combination signal representative of a combination of ranges including the suction pressure represented by said suction range signal, means responsive to said discharge range signal to provide a discharge range combination signal representative of a combination of ranges including the discharge pressure represented by said discharge range signal, means responsive to said suction range signal and to said discharge range signal to provide a further signal, and means responsive to said suction range combination signal, said discharge range combination signal, and said further signal to place said engines in the predetermined one of the operating conditions for said suction and discharge pressures in the system.

3. In a pump control arrangement for controlling the operating condition of a plurality of engines which operate pump means for a system in accordance with the value of the suction and discharge pressures in the system, variable predetermined engine operating conditions being provided for various values of suction and discharge pressure, the improvement comprising input means having transducer means adapted to provide analog signals representative of suction and discharge pressures, analog to digital converter means connected to said input means for providing digital signals representative of the suction and discharge pressures in the system, means responsive to said digital signals to provide a suction range signal representing a predetermined range including the suction pressure represented by said digital signals, and a discharge range signal representing a predetermined range including the discharge pressure represented by said digital signals, means responsive to said suction range signal to provide a suction range combination signal representative of a combination of ranges including the suction pressure represented by said suction range signal, means responsive to said discharge range signal to provide a discharge range combination signal representative of a combination of ranges including the discharge pressure represented by said discharge range signal, and means responsive to said suction range combination signal and said discharge range combination signal to place said engines in the predetermined one of the operating conditions for said suction and discharge pressures in the system.

References Cited in the file of this patent

UNITED STATES PATENTS

| | | |
|---|---|---|
| 2,244,700 | Horton | June 10, 1941 |
| 2,428,811 | Rajchman | Oct. 14, 1947 |
| 2,432,553 | Zilly | Dec. 16, 1947 |
| 2,888,875 | Buck | June 2, 1959 |
| 2,992,409 | Lawrence | July 11, 1961 |
| 3,005,411 | Metz | Oct. 24, 1961 |

OTHER REFERENCES

"The Design of Switching Circuits," by Keister et al., Van Nostrand Co. (1951), pages 474–480.